(12) United States Patent
Hakuta et al.

(10) Patent No.: US 11,795,974 B2
(45) Date of Patent: Oct. 24, 2023

(54) BLOWER WITH SILENCER AND MOVING OBJECT WITH PROPELLER

(71) Applicant: FUJIFILM Corporation, Tokyo (JP)

(72) Inventors: Shinya Hakuta, Ashigarakami-gun (JP); Shogo Yamazoe, Ashigarakami-gun (JP); Yoshihiro Sugawara, Ashigarakami-gun (JP); Akihiko Ohtsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/887,119

(22) Filed: Aug. 12, 2022

(65) Prior Publication Data

US 2022/0389939 A1 Dec. 8, 2022

Related U.S. Application Data

(63) Continuation of application No. PCT/JP2021/012358, filed on Mar. 24, 2021.

(30) Foreign Application Priority Data

Mar. 26, 2020 (JP) ................................. 2020-055557

(51) Int. Cl.
*F04D 29/66* (2006.01)
*B64C 39/02* (2023.01)
(Continued)

(52) U.S. Cl.
CPC .......... *F04D 29/665* (2013.01); *B64C 39/024* (2013.01); *F04D 19/002* (2013.01); *F04D 29/542* (2013.01); *B64U 30/20* (2023.01)

(58) Field of Classification Search
CPC .... F04D 29/665; F04D 19/002; F04D 29/542; F04D 19/00; F04D 29/526; F04D 29/545;
(Continued)

(56) References Cited

U.S. PATENT DOCUMENTS

2009/0308685 A1* 12/2009 Gorny ................... F04D 29/665
181/205
2010/0078258 A1 4/2010 Tanabe et al.
(Continued)

FOREIGN PATENT DOCUMENTS

JP         4-265500 A      9/1992
JP         2005-248734 A   9/2005
(Continued)

OTHER PUBLICATIONS

International Preliminary Report on Patentability and Written Opinion of the International Searching Authority for International Application No. PCT/JP2021/012358, dated Oct. 6, 2022, with an English translation.
(Continued)

*Primary Examiner* — Hoang M Nguyen
(74) *Attorney, Agent, or Firm* — Birch, Stewart, Kolasch & Birch, LLP

(57) ABSTRACT

A fan, and a silencer that silences a sound generated by the fan are provided, in which the silencer has a resonance characteristic, the silencer is disposed at a position connected to a sound field space of the sound generated by the fan, and a sum of an absorbance and a reflectivity of the silencer at a resonance frequency is 10% to 43% and a standardized half-width of the silencer is more than 0.05 and 0.25 or less.

17 Claims, 18 Drawing Sheets

(51) Int. Cl.
  *F04D 19/00*   (2006.01)
  *F04D 29/54*   (2006.01)
  *B64U 30/20*   (2023.01)
(58) Field of Classification Search
  CPC ..... B64C 39/024; B64C 11/001; B64U 30/20; B64U 50/19; B64U 30/26; F05D 2260/963; G10K 11/16; G10K 11/172
  USPC ........................................................ 415/119
  See application file for complete search history.

(56)                References Cited

U.S. PATENT DOCUMENTS

2021/0164690 A1    6/2021  Sugawara et al.
2021/0233507 A1*   7/2021  Sugawara ............ G10K 11/172
2022/0010813 A1*   1/2022  Sugawara ............ G10K 11/172

FOREIGN PATENT DOCUMENTS

JP        2020-40511 A      3/2020
WO    WO 2014/006650 A1     1/2014
WO    WO 2020/036029 A1     2/2020
WO    WO 2020/036031 A1     2/2020

OTHER PUBLICATIONS

International Search Report for International Application No. PCT/JP2021/012358, dated Jun. 1, 2021, with an English translation.
Extended European Search Report for corresponding European Application No. 21775316.9, dated Aug. 16, 2023.

* cited by examiner

BLOWER WITH SILENCER AND MOVING OBJECT WITH PROPELLER

CROSS-REFERENCE TO RELATED APPLICATIONS

This application is a Continuation of PCT International Application No. PCT/JP2021/012358 filed on Mar. 24, 2021, which claims priority under 35 U.S.C § 119(a) to Japanese Patent Application No. 2020-055557 filed on Mar. 26, 2020. Each of the above application(s) is hereby expressly incorporated by reference, in its entirety, into the present application.

BACKGROUND OF THE INVENTION

1. Field of the Invention

The present invention relates to a blower with a silencer and a moving object with a propeller.

2. Description of the Related Art

In an information device, such as a personal computer (PC), a server computer, a projector, and a duplicator, in order to cool an inside of the device, an axial fan is used to exhaust heated air in the device. In addition, in a device, such as a dryer and an electric fan, a fan (mainly axial fan) is used for the purpose of sending wind.

Further, in aircraft, such as a helicopter, an unmanned aerial vehicle (UAV) that can fly independently, such as a so-called drone, and a flying object, such as an automobile that can fly in the air, lifting power is generated by rotating a propeller (propeller fan) and sending wind, as a result, flight (movement in the air) is possible. In the following, such a device will be referred to as a "moving object with a propeller".

Noise may be generated from a cooling or blowing axial fan, a propeller, and a moving object with a propeller described above (hereinafter, these are collectively referred to as "blower"). Out of a noise generated from the blower, a noise of which a frequency is determined by the number of blades and a rotation speed thereof has a high sound pressure at a specific frequency and a very strong pure tone (tone) component, which is jarring and causes a problem.

Note that, in the following description, the "fan" and the "axial fan" include the propeller (propeller fan).

In order to reduce noise described above, even in a case in which a porous sound absorbing material generally used for silencing is used, sound volume is uniformly reduced in a wide frequency band. Therefore, in a case in which the sound pressure is high only at a specific frequency as described above, it is difficult to relatively lower the sound pressure of a specific frequency.

In addition, in a case in which the porous sound absorbing material is used, it is necessary to increase a volume thereof in order to obtain a sufficient silencing effect, but since it is necessary to ensure an air volume due to a fan, there is a problem in which a size of the porous sound absorbing material is limited, and thus it is difficult to achieve both high ventilation property and soundproofing performance.

In order to silence such noise of the fan generated at a specific frequency, it has been proposed to use a resonance type silencer.

For example, JP2005-248734A a fan device including a blade member that is rotatably provided, a flow passage of gas for causing gas to flow into an inside by rotation of the blade member and causing the inflow gas to flow to an outside, an inclined surface for expanding the flow passage to the outside, and a casing having a recess portion provided on the inclined surface. JP2005-248734A discloses that the fan device resonates a sound with air in the recess portion to subject the sound to resonance absorption.

SUMMARY OF THE INVENTION

Here, according to the examination by the present inventors, in a case in which a resonator is disposed in the flow passage of the air flow (wind) generated by the axial fan, there is a problem that wind noise is generated due to the wind of the fan in a structural portion, such as the recess portion provided in the resonator, and the wind noise is amplified by the resonator. In addition, in a case in which the wind continues to blow on a surface of a resonance structure of the resonator, the resonance is suppressed. Therefore, particularly in the resonator disposed under a high air volume, there is a problem that the silencing effect of by the resonance is reduced and the wind noise is amplified.

The present invention is to solve the problems in the related art described above, to suppress the amplification of the wind noise, and to provide the blower with the silencer capable of suitably silencing the sound generated by the fan. In addition, the present invention is to provide a moving object with a propeller, the moving object comprising the blower with the silencer.

The present invention solves the problems by following configurations.

[1] A blower with a silencer, the blower comprising a fan, and a silencer that silences a sound generated by the fan, in which the silencer has a resonance characteristic, the silencer is disposed at a position connected to a sound field space of the sound generated by the fan, and a sum of an absorbance and a reflectivity of the silencer at a resonance frequency measured by using an acoustic pipe is 10% to 43% and a standardized half-width of the silencer is more than 0.05 and 0.25 or less.

[2] The blower with a silencer according to [1], in which the silencer is connected to an inner space of the fan.

[3] The blower with a silencer according to [2], in which the silencer has a flow passage communicating with the inner space of the fan.

[4] The blower with a silencer according to any one of [1] to [3], in which the resonance frequency of the silencer measured by using the acoustic pipe deviates from a frequency of a discrete frequency sound caused by the fan by 1% to 10%.

[5] The blower with a silencer according to [4], in which the silencer is connected to a position at which a sound pressure of a sound pressure distribution at the frequency of the discrete frequency sound caused by the fan is high, and the resonance frequency of the silencer is lower than the frequency of the discrete frequency sound.

[6] The blower with a silencer according to [4], in which the silencer is connected to a position at which a sound pressure of a sound pressure distribution at the frequency of the discrete frequency sound caused by the fan is low, and the resonance frequency of the silencer is higher than the frequency of the discrete frequency sound.

[7] The blower with a silencer according to any one of [1] to [6], in which the silencer is an air column resonator, and a resonance pipe of the air column resonator has a bent structure.

[8] The blower with a silencer according to any one of [1] to [7], in which the silencer is a combination of a resonator and a porous sound absorbing material.

[9] The blower with a silencer according to any one of [1] to [8], in which the fan is an axial fan, and the silencer is disposed at a position that does not overlap with a region formed by rotation of a rotor blade as viewed from an axial direction of the axial fan.

[10] The blower with a silencer according to any one of [1] to [9], in which the fan is an axial fan having a fixed blade, and the silencer is connected to at least one fixed blade opening portion between the fixed blades.

[11] The blower with a silencer according to [10], in which the silencer is connected to all the fixed blade opening portions.

[12] A moving object with a propeller, the moving object comprising the blower with a silencer according to any one of [1] to [11], in which the fan of the blower with a silencer is a propeller, and the moving object with a propeller flies by rotation of the propeller.

[13] The moving object with a propeller according to [12], in which the silencer of the blower with a silencer is disposed around the propeller to form a propeller guard.

[14] The moving object with a propeller according to [12] or [13], in which an outer shape of the silencer in a case in which the silencer of the blower with a silencer is viewed from a rotation axis direction of the propeller is a circle or an arc.

[15] The moving object with a propeller according to [14], in which the silencer is an air column resonator including a bent resonance pipe, and a part of the resonance pipe is bent in an arc shape in a case in which the silencer is viewed from the rotation axis direction.

According to the present invention, it is possible to provide the blower with the silencer that suppresses the amplification of the wind noise and can suitably silence the sound generated by the fan. In addition, according to the present invention, it is possible to provide the moving object with the propeller, the moving object comprising the blower with the silencer.

DESCRIPTION OF THE PREFERRED EMBODIMENTS

The present invention will be described below in detail.

The description of configuration elements described below is based on a representative embodiment of the present invention, but the present invention is not limited to such an embodiment.

Note that in the present specification, the numerical range represented by "to" means a range including numerical values denoted before and after "to" as a lower limit value and an upper limit value.

[Blower with Silencer]

An embodiment of the present invention relates to a blower with a silencer, the blower including a fan, and a silencer that silences a sound generated by the fan, in which the silencer has a resonance characteristic, the silencer is disposed at a position connected to a sound field space of the sound generated by the fan, and a sum of an absorbance and a reflectivity of the silencer at a resonance frequency measured by using an acoustic pipe is 10% to 43% and a standardized half-width of the silencer is more than 0.05 and 0.25 or less.

A configuration of the blower with the silencer according to the embodiment of the present invention will be described with reference to drawings.

Figure 1:
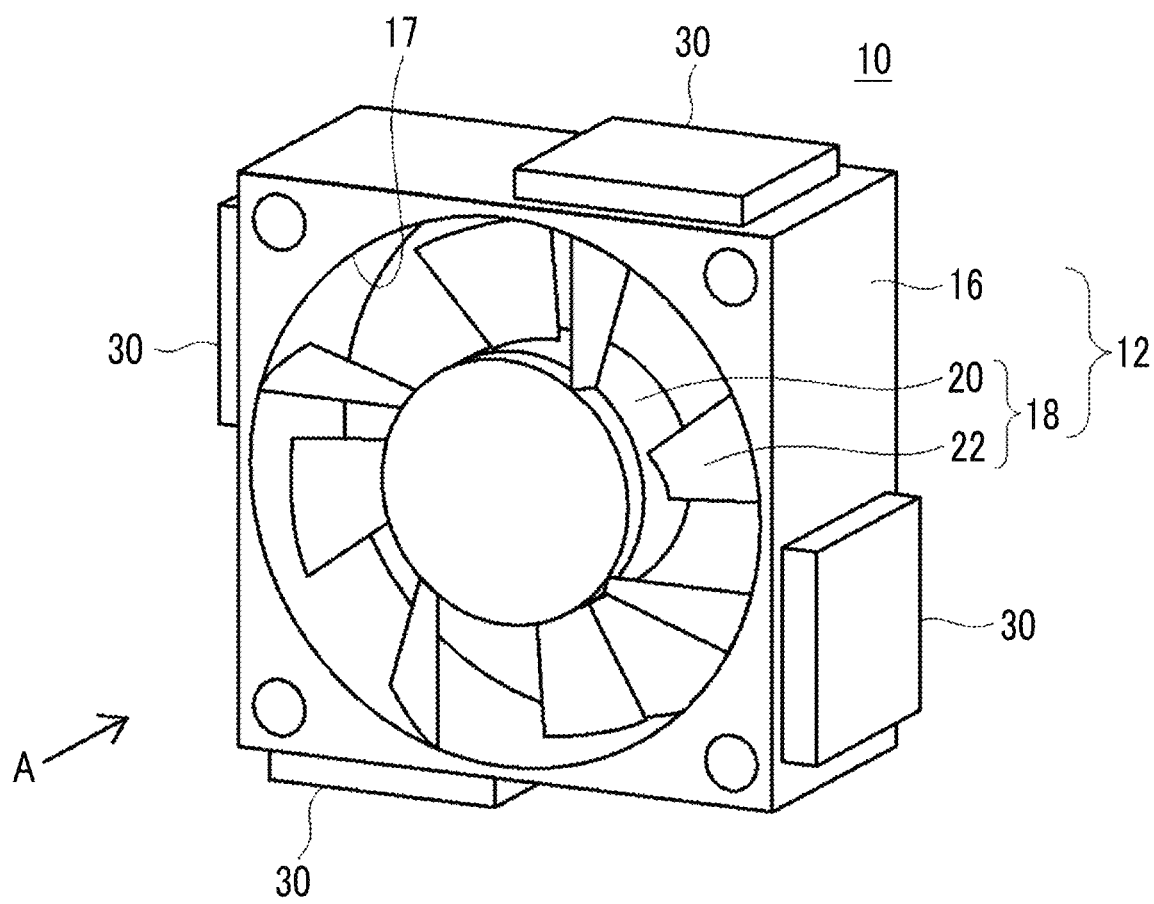
FIG. 1 is a perspective view schematically showing an example of a blower with a silencer according to an embodiment of the present invention.
Figure 2:
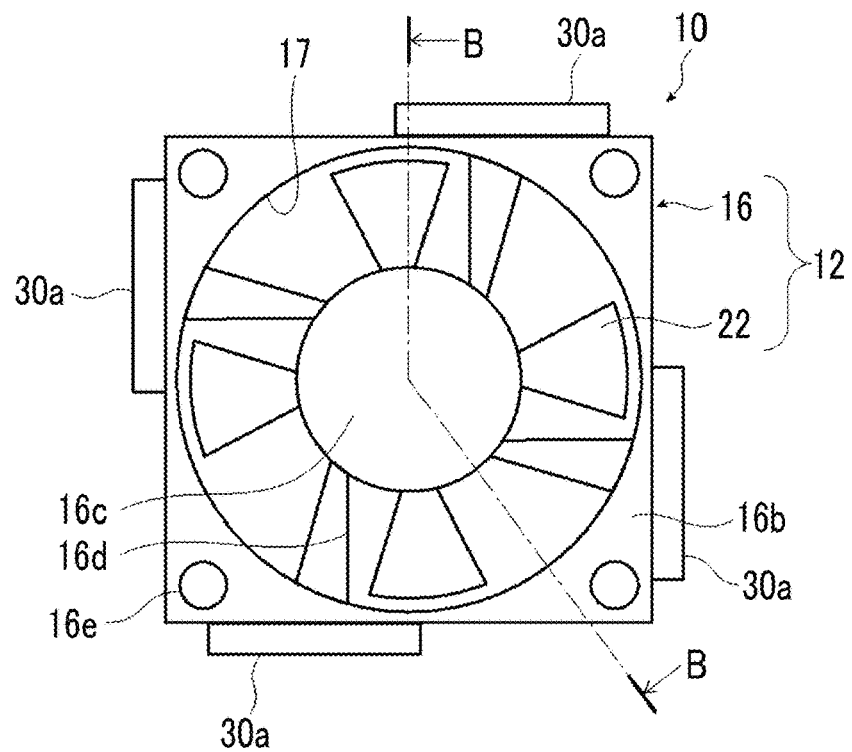
FIG. 2 is a front view of the blower with the silencer of FIG. 1 as viewed from an A direction.
Figure 3:
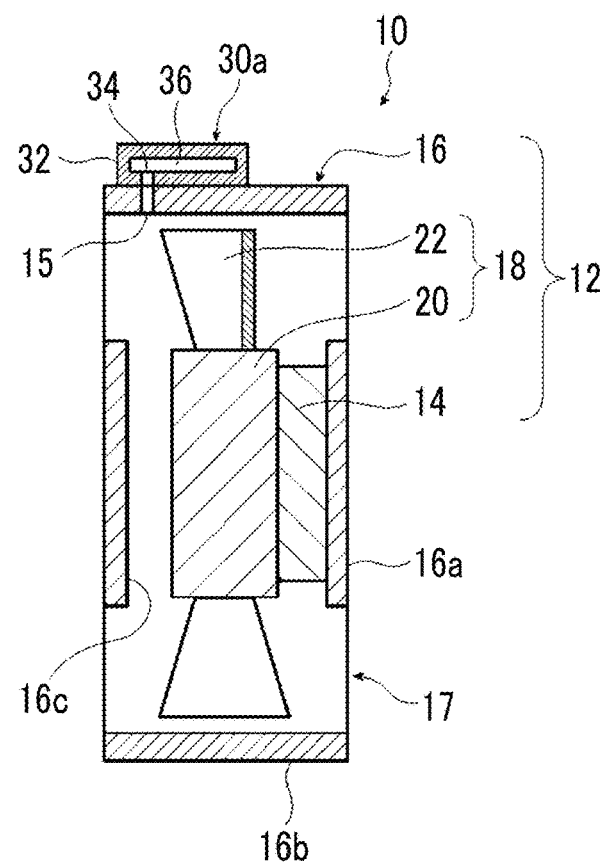
FIG. 3 is a cross-sectional view taken along a line B-B of FIG. 2.

FIG. 1 is a perspective view schematically showing an example of the blower with the silencer according to a preferred embodiment of the present invention. FIG. 2 is a front view of FIG. 1 as viewed from an A direction. FIG. 3 is a cross-sectional view taken along a line B-B of FIG. 2.

A blower 10 with the silencer shown in FIGS. 1 to 3 includes an axial fan 12 having a casing 16, a motor 14, and a rotor blade 18, and a silencer 30.

The axial fan 12 is basically a known axial fan, and rotates a rotor blade having a plurality of blades to impart kinetic energy to a gas to blow the gas in an axial direction.

Specifically, the axial fan 12 includes the casing 16, the motor 14 attached to the casing 16, and the rotor blade 18 comprising a shaft portion 20 attached to the motor 14 and rotated, and a blade 22 formed to protrude to an outside of the shaft portion 20 in a radial direction.

Note that, in the following description, a rotation axis of the shaft portion 20 (rotor blade 18) is simply referred to as the "rotation axis", and the rotation axis direction from the shaft portion 20 (rotor blade 18) is simply referred to as "axial direction". In addition, the radial direction of the shaft portion 20 (rotor blade 18) is simply referred to as "radial direction". In addition, a rotation direction of the rotor blade 18 is also referred to as "circumferential direction".

The motor 14 is a general electric motor which rotates the rotor blade 18.

The shaft portion 20 of the rotor blade 18 has a substantially columnar shape, and one bottom surface side thereof is attached to a rotation shaft of the motor 14, and the rotor blade 18 is rotated by the motor 14.

The blade 22 is formed on a circumferential surface of the shaft portion 20 to protrude an outer side of the circumferential surface in the radial direction. In addition, the rotor blade 18 has a plurality of blades 22, and the plurality of blades 22 are arranged in a circumferential direction of the circumferential surface of the shaft portion 20. In examples shown in FIGS. 1 to 3, the rotor blade 18 has a configuration having four blades 22, but the present invention is not limited to this, and the rotor blade 18 need only have the plurality of blades 22.

In addition, a shape of the blade 22 can be a shape used in a known axial fan in the related art.

The thickness of the blade 22 in the rotation axis direction is about 5 mm to 200 mm. In addition, the thickness of the shaft portion 20 is about 5 mm to 200 mm.

In addition, it is preferable that the maximum value of the thickness of the blade 22 in the rotation axis direction and the thickness of the shaft portion 20 be substantially the same.

In addition, a diameter of the shaft portion 20 is about 10 mm to 1500 mm. In addition, an outer diameter of the rotor blade 18, that is, an outer diameter of the blade 22 passing through the most distal end side in the radial direction is about 20 mm to 2000 mm.

The rotor blade 18 having the blade 22 is rotated by the motor 14 to generate an air flow (wind) in the rotation axis direction. A flow direction of the air flow is not limited, and may flow, in the rotation axis direction, from the motor 14 side to a direction opposite to the motor 14, or may flow from a side opposite to the motor 14 to the motor 14 side.

In addition, the casing 16 fixes the motor 14, and surrounds the rotor blade 18 (blade 22) that can be rotated in the radial direction.

The thickness of the casing 16 in the rotation axis direction is thicker than the thicknesses of the blade 22 and the shaft portion 20 such that the rotor blade 18 can be protected from the outside.

The casing 16 includes a support portion 16a that supports the motor 14 on one surface side in the rotation axis direction, an outer frame portion 16b that surrounds the rotor blade 18 from the outside in the radial direction, a cover portion 16c that covers a region of the shaft portion 20 on the other surface side in the rotation axis direction, and a fixed blade 16d that protrudes from the support portion 16a and/or the cover portion 16c toward the outside in the radial direction, and connects the support portion 16a and/or cover portion 16c, and the outer frame portion 16b. The fixed blade 16d has a known blade shape, and has a function of rectifying the air flow generated by the rotation of the rotor blade 18.

The outer frame portion 16b has a cubic shape having an inner space 17 that penetrates in one direction. The support portion 16a is disposed on one opening surface side of the inner space 17 in the surface of the outer frame portion 16b, and the cover portion 16c is disposed on the other opening surface side. The opening portion of the inner space 17 in the surface of the outer frame portion 16b corresponds to an inner space of the axial fan according to the embodiment of the present invention. In the following description, the opening portion of the inner space 17 in the surface of the outer frame portion 16b is also referred to as an inner space 17.

A diameter of the support portion 16a need only be a size that can support the motor 14 and does not inhibit a flow of the air flow generated by the rotation of the rotor blade 18. For example, the diameter of the support portion 16a is substantially the same as the diameter of the shaft portion 20.

Similarly, a diameter of the cover portion 16c need only be a size that can protect the shaft portion 20 from the outside and does not inhibit a flow of the air flow generated by the rotation of the rotor blade 18. For example, the diameter of the cover portion 16c is substantially the same as the diameter of the shaft portion 20.

A width, the number, and the like of the fixed blade 16d need only be a size, the number, and the like that can reliably fix the support portion 16a and the outer frame portion 16b, and the cover portion 16c and the outer frame portion 16b, respectively, and does not inhibit a flow of the air flow generated by the rotation of the rotor blade 18.

The thickness of the casing 16 in the rotation axis direction need only be a thickness that can protect the rotor blade 18 from the outside, suppress the air flow in the radial direction among the air flows generated by the rotation of the rotor blade 18, and increase the air volume in the rotation axis direction, that is, need only be a thickness about 1.01 times to 3.00 times the thickness of the blade 22 and/or the shaft portion 20.

Note that, in the shown example, the configuration has been adopted in which the casing 16 has the support portion 16a that supports the motor 14 and the cover portion 16c that covers the region of the shaft portion 20, but a configuration may be adopted in which the casing 16 has only the support portion 16a that supports the motor 14 and does not have the cover portion 16c that covers the region of the shaft portion 20.

In addition, in the casing 16, at least one of the member connecting the support portion 16a and the outer frame portion 16b or the member connecting the cover portion 16c and the outer frame portion 16b need only be the fixed blade 16d, and the other may be the connecting portion that simply connects the members to each other. Note that, in a case in which the air flow generated by the rotation of the rotor blade 18 flows to the support portion 16a side, the member that connects the support portion 16a and the outer frame portion 16b need only be the fixed blade 16d, and in a case in which the air flow generated by the rotation of the rotor blade 18 flows to the cover portion 16c side, the member that connects the cover portion 16c and the outer frame portion 16b need only be the fixed blade 16d. Alternatively, the casing 16 may have a configuration in which the fixed blade 16d is not provided. That is, the member that connects the support portion 16a and the outer frame portion 16b and the member that connects the cover portion 16c and the outer frame portion 16b may not have a blade shape, and the function of rectifying the air flow generated by the rotation of the rotor blade 18 is not provided.

Further, the axial fan 12 may have various configurations of a known axial fan.

For example, in the examples shown in FIGS. 1 to 3, the axial fan 12 has a hole 16e into which a fastening member such as a screw is inserted in a case in which the axial fan 12 is fixed to various devices.

The silencer 30 is disposed at a position connected to a sound field space of the sound generated by the axial fan 12. The sound field space is a region of an acoustic proximity field that percolates from the inside of the axial fan 12 and the opening portion of the inner space 17 of the axial fan 12. The region of the acoustic proximity field that percolates from an opening end is a region having the sound pressure level that is smaller than the sound pressure level at the center of the opening portion of the inner space 17 of the axial fan 12 by 20 dB. The region of the acoustic proximity field can be obtained by simulation of the axial fan or by actually measuring a spatial distribution of the sound pressure by using a microphone with a probe or the like.

It is preferable that the silencer 30 be disposed at the position connected to the inner space 17 of the axial fan 12. Here, the fact that the silencer 30 is connected to the inner space 17 means that, in the silencer 30, a portion for allowing the sound waves to enter the silencer 30 in order to exert a silencing function communicates with the inner space 17. For example, in a Helmholtz resonator and an air column resonator, the opening portion corresponds to a portion for allowing the sound waves to enter. In addition, in the film type resonator, the surface of the film corresponds to a portion for allowing the sound waves to enter.

In the example shown in FIG. 3, the silencer 30 is a Helmholtz resonator 30a, and four Helmholtz resonators 30a are disposed on an outer circumferential surface of the outer frame portion 16b of the casing 16.

As is well known, in the Helmholtz resonator 30a, an opening portion 34 that communicates an inner space 36 to the outside is formed in a case 32 having the inner space 36. The Helmholtz resonator 30a has a structure in which the air in the inner space 36 acts as a spring, the air in the opening portion 34 acts as a mass (mass), the mass spring resonates, and a portion in the vicinity of the wall of the opening portion 34 absorbs the sound by thermal viscous friction.

Note that, in the following description, in a case in which it is not necessary to distinguish the types of silencers, such as the Helmholtz resonator 30a, an air column resonator 30b, and a film type resonator 30c described below, the silencers are collectively referred to as the silencer 30.

As shown in FIG. 3, the Helmholtz resonator 30a is disposed with the opening portion 34 facing the inner space 17 side of the casing 16. A through-hole 15 that penetrates from the outer circumferential surface to an inner circumferential surface of the outer frame portion 16b is formed at a position of the outer frame portion 16b of the casing 16 corresponding to the opening portion 34 of the Helmholtz resonator 30a. As a result, the opening portion 34 of the Helmholtz resonator 30a communicates with the inner space 17 of the casing 16 via the through-hole 15. Therefore, the Helmholtz resonator 30a is connected to the inner space 17.

Here, the blower 10 with the silencer according to the embodiment of the present invention has a configuration in which the silencer has the resonance characteristic, and a sum of the absorbance and the reflectivity of the silencer at a resonance frequency measured by using the acoustic pipe is 10% to 43% and the standardized half-width of the silencer is more than 0.05 and 0.25 or less. That is, the silencer has a low resonance peak and a broad (broadband) resonance characteristic. Note that the standardized half-width is a value obtained by dividing the half-width (Hz) by the resonance frequency (Hz). In addition, the absorbance and the reflectivity at the resonance frequency of the silencer can be measured by a 4-microphone method using the acoustic pipe. The measuring method of the absorbance and the reflectivity is according to ASTM E2611, and the same measurement can be performed by using WinZac MTX manufactured by Nihon Onkyo Engineering Co., Ltd.

In the following description, the broad (broadband) resonance characteristic with a low resonance peak is also referred to as "weak resonance". As an example, as shown in Example 1 of FIG. 11 described below, in the resonance characteristic of the silencer having a weak resonance characteristic, the sum of the absorbance and the reflectivity at the resonance frequency (maximum value of the sum of the absorbance+the reflectivity in the vicinity of the resonance) is about 26%, which is low, and the half-width is about 212 Hz, which is broad. The standardized half-width is 0.12.

Generally, the resonator is used to silence a peak sound having a high sound pressure at a specific frequency. In the silencing by the resonator, it is considered to use the resonator having a high peak and a steep resonance peak in order to enhance the silencing effect by the resonance. For example, as shown in Comparative Example 1 of FIG. 11 described below, the resonator is used in which the sum of the absorbance and the reflectivity at the resonance frequency is 56% or more, which is high, and the half-width (the standardized half-width is 0.3) is 84 Hz or less, which is narrow. However, as described above, in a case in which such a resonator having a steep resonance peak is used to silence the fan that generates the air flow, there is a problem that the wind noise due to the wind of the fan is generated in the structural portion, such as the recess portion of the resonator, and the wind noise is amplified by the resonator in the vicinity of the resonance frequency of the resonator. For example, since the Helmholtz resonator and the air column resonator have the opening portion, the wind noise is generated in a case in which the wind hits the opening portion, and the generated wind noise is amplified by the resonator. In addition, in a case in which the wind continues to blow on the surface of the resonance structure of the resonator, the silencing effect due to the resonance is suppressed. For example, in a case of Helmholtz resonator and air column resonator, in a case in which the wind continues to blow on the surface of the opening portion, it is difficult for the sound waves to propagate from the opening portion to the inside of the resonator, and the resonance peak is suppressed. In addition, in a case of the film type resonator, in a case in which the wind continues to blow on the surface of the film, the vibration of the film is suppressed and the resonance is suppressed. Therefore, particularly in the resonator disposed under a high air volume, there is a problem that the silencing effect of by the resonance is reduced and the wind noise is amplified.

On the other hand, the blower with the silencer according to the embodiment of the present invention uses the silencer having the weak resonance characteristic for silencing the fan. The resonator has a low resonance characteristic with a resonance peak in which the sum of the absorbance and the reflectivity is 10% to 43%, so that the amplification of the wind noise generated in the structural portion of the resonator by the resonator can be suppressed. In addition, the resonator has a broad (broadband) resonance characteristic in which the standardized half-width is more than 0.05 and 0.25 or less, so that it is found that the sound can be silenced by cancellation by interference by using the phase change at a slightly deviated frequency in the vicinity of the resonance frequency. Even in a case in which the resonance peak (height of the peak of the resonance) is suppressed by the wind, the resonance width (width to the base of the peak) and the accompanying phase change are not suppressed, so that the silencing effect can be exerted. As a result, even in a case in which the wind continues to blow on the surface of the resonance structure of the resonator and the resonance is suppressed, the sound can be effectively silenced.

As described above, regarding the condition of the resonator that acts well for the peak sound and the trade-off relationship, such as the amplification of the wind noise by the resonator in the related art, the blower with the silencer according to the embodiment of the present invention can suppress the amplification of the wind noise and can suitably silence the sound generated by the fan by weakening the resonance of the silencer and using cancellation by interference as the silencing mechanism.

Here, from the viewpoints of suppressing the amplification of the wind noise and suitably silencing the sound generated by the fan, the sum of the absorbance and the reflectivity at the resonance frequency of the silencer is 10% to 43%, preferably 14% to 35%, and more preferably 18% to 30%. In addition, the standardized half-width is more than 0.05 and 0.25 or less, preferably 0.08 or more and 0.20 or less, more preferably 0.10 or more and 0.15 or less, and most preferably 0.11 or more and 0.14 or less.

In addition, in the examples shown in FIGS. 2 and 3, the configuration has been adopted in which the Helmholtz resonator 30a is used as the silencer, but the present invention is not limited to this.

Figure 4:
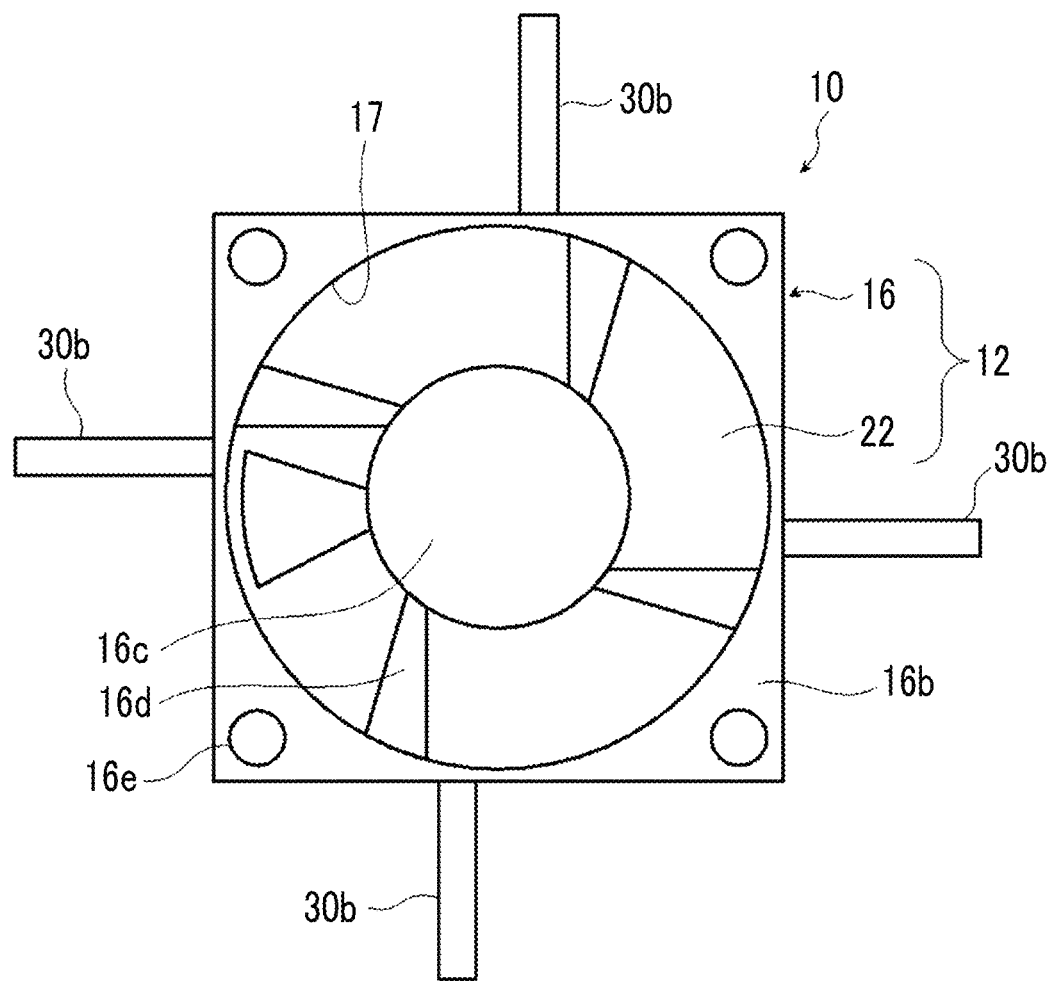
FIG. 4 is a cross-sectional view schematically showing another example of the blower with the silencer according to the embodiment of the present invention.

For example, as in the example shown in FIG. 4, a configuration may be adopted in which the air column resonator 30b is used as the silencer. As is well known, in the air column resonator, the resonance occurs by generating a standing wave in a resonance pipe having an opening. In the blower 10 with the silencer shown in FIG. 4, the air column resonator 30b is disposed on each of four outer circumferential surfaces of the outer frame portion 16b of the casing 16 of the axial fan 12. Each of the four air column resonators 30b has an opening connected to a fixed blade opening portion (inner space 17) (not shown).

Note that, in the example shown in FIG. 4, the configuration has been adopted in which the air column resonator 30b includes a resonance pipe extending to the outer side from the axial fan 12 in the radial direction, but is not limited to this. The air column resonator 30b may have a configuration in which the resonance pipe extends in the axial direction or a configuration in which the resonance pipe extends in the circumferential direction as long as the opening is connected to the inner space 17.

Figure 5:
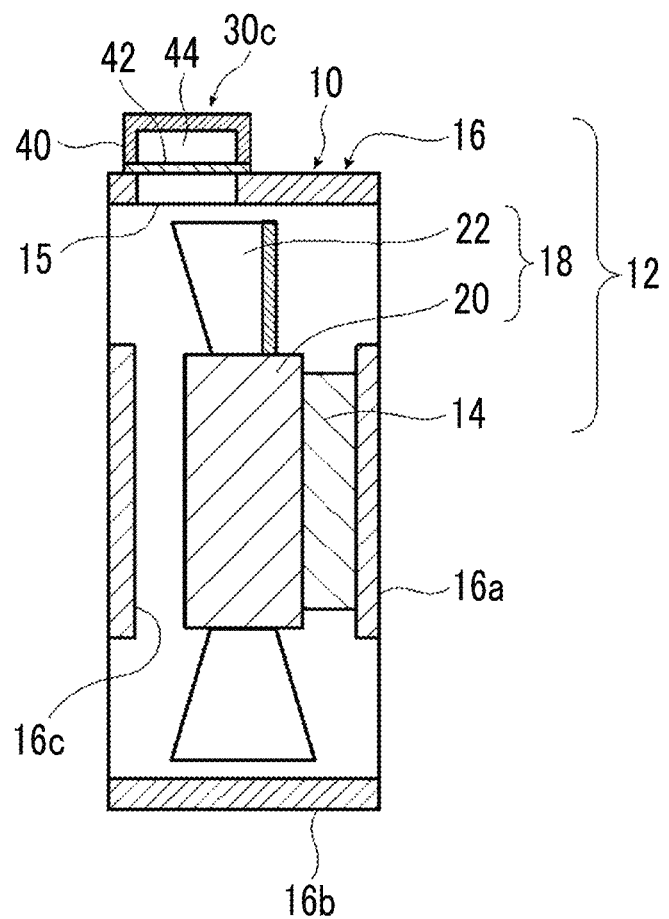
FIG. 5 is a cross-sectional view schematically showing still another example of the blower with the silencer according to the embodiment of the present invention.

In addition, as in the example shown in FIG. 5, a configuration may be adopted in which the film type resonator 30c is used as the silencer. The film type resonator 30c has a frame 40 and a film 42, and resonates due to the film vibration of the film 42 supported by the frame 40 to allow vibration. In the blower 10 with the silencer shown in FIG. 5, the film type resonator 30c is disposed on the outer circumferential surface of the outer frame portion 16b of the casing 16 of the axial fan 12. The film type resonator 30c has the film 42 disposed toward the casing 16 and is connected to the fixed blade opening portion (inner space 17) via a penetration portion formed in the casing 16.

The frame 40 has a shape in which a rectangular parallelepiped shaped opening portion with a bottom surface formed on one surface is formed. That is, the frame 40 is a bottomed box shape with one surface open.

The film 42 is a film-like member, and covers an opening surface of the frame 40 on which the opening portion is formed, and a peripheral portion thereof is fixed to the frame 40 and is supported to allow vibration thereof.

In addition, a back space 44 surrounded by the frame 40 and the film 42 is formed on a back side (frame 40 side) of the film 42. In the examples shown in FIG. 5, the back space is a closed space which is closed.

Here, a method of making the resonance characteristic of the silencer the weak resonance characteristic will be described below. Note that the method of making the resonance characteristic of the silencer the weak resonance characteristic is not limited to the following description. All of the following configurations act as the resistance to resonance vibration. Therefore, the silencing peak at the resonance frequency is low, and the half-width is broad accordingly.

As the method of making the resonance characteristic of the silencer the weak resonance characteristic, there is a method of adopting a configuration in which the silencer is a combination of the resonator and a porous sound absorbing material.

Figure 6:
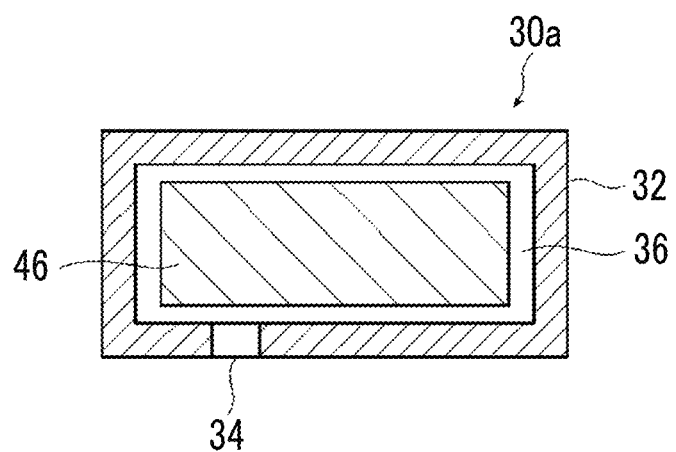
FIG. 6 is a cross-sectional view schematically showing an example of the silencer.
Figure 7:
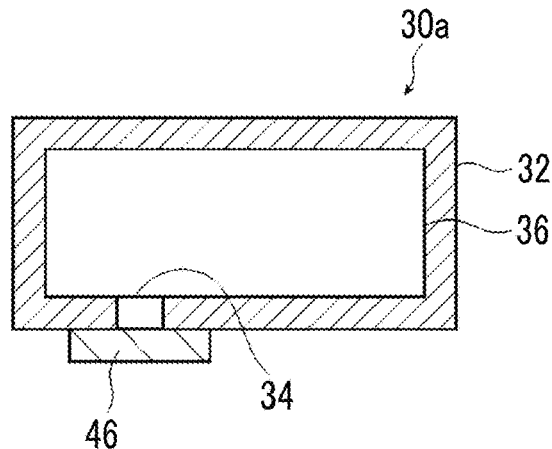
FIG. 7 is a cross-sectional view schematically showing another example of the silencer.

As an example, the silencer having the weak resonance characteristic has a configuration in which a porous sound absorbing material 46 is disposed in the inner space 36 of the Helmholtz resonator 30a, as shown in FIG. 6. Alternatively, as shown in FIG. 7, the silencer having the weak resonance characteristic has a configuration in which the porous sound absorbing material 46 is disposed to cover the opening portion 34 of the Helmholtz resonator 30a. Note that, in the examples shown in FIGS. 6 and 7, the Helmholtz resonator is used as the resonator, but in a case of the air column resonator as well, a configuration may be adopted in which the porous sound absorbing material is disposed inside (in the resonance pipe), or a configuration may be adopted in which the porous sound absorbing material, a cloth, a nonwoven fabric, a porous penetrating plate, and the like are disposed in the opening portion of the air column resonator. It is not necessary to fill the entire inside with the porous sound absorbing material, and a structure in which the porous sound absorbing material or the like is attached only to a wall portion may be adopted.

Regarding the type, the size, the flow resistance, the density, the porosity, and the like of the porous sound absorbing material need only be appropriately set such that the sum of the absorbance and the reflectivity at the resonance frequency of the silencer is 10% to 43%, and the standardized half-width is more than 0.05 and 0.25 or less.

As a type of the porous sound absorbing material, a known porous sound absorbing material can be appropriately used. For example, various known porous sound absorbing material can be used, such as foam materials and materials containing minute air such as urethane foam, soft urethane foam, wood, ceramic particle sintered material, and phenol foam; fibers and nonwoven fabric materials such as glass wool, rock wool, microfibers (Thinsulate manufactured by 3M), a floor mat, a carpet, a meltblown nonwoven fabric, a metal nonwoven fabric, a polyester nonwoven fabric, metal wool, felt, an insulation board and a glass nonwoven fabric, and wood wool cement board, nanofiber materials such as silica nanofiber, and gypsum board.

A flow resistance of the porous sound absorbing material is not particularly limited, but is preferably 1000 to 100000 (Pa·s/m$^2$), more preferably 3000 to 80000 (Pa·s/m$^2$), and still more preferably 5000 to 50000 (Pa·s/m$^2$).

The flow resistance of the porous sound absorbing material can be evaluated by measuring a perpendicular incident sound absorbance of the porous sound absorbing material having a thickness of 1 cm and fitting by the Miki model (J. Acoust. Soc. Jpn., 11(1), pp. 19 to 24 (1990)). Alternatively, an evaluation may be made according to "ISO 9053".

In addition, a plurality of porous sound absorbing materials having different flow resistances may be laminated.

Figure 8:
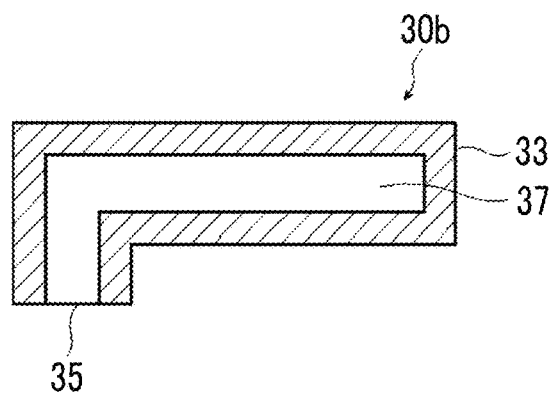
FIG. 8 is a cross-sectional view schematically showing still another example of the silencer.

As a method of making the resonance characteristic of the silencer the weak resonance characteristic, as shown in FIG. 8, there is a method of adopting a structure in which an inside of the resonance pipe 37 of the air column resonator 30b is bent.

Note that the position, the angle, the number of times, the presence or absence of rounded corners inside, and the like of bending need only be appropriately set such that the sum of the absorbance and the reflectivity at the resonance frequency of the silencer is 10% to 43%, and the standardized half-width is more than 0.05 and 0.25 or less.

From the viewpoint of ease of manufacturing, it is desirable that the number of bends be one. In addition, in a case in which the resonance is too weak, the angle can be reduced or the corners of the inner bends can be rounded to facilitate the sound propagation.

Figure 9:
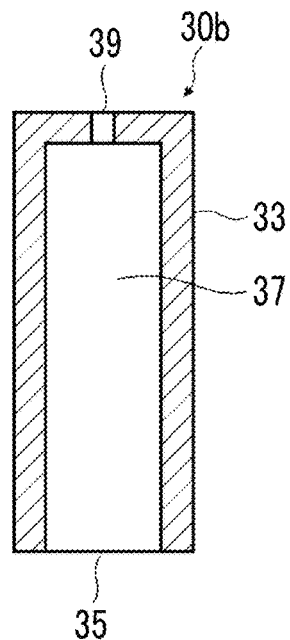
FIG. 9 is a cross-sectional view schematically showing still another example of the silencer.
Figure 10:
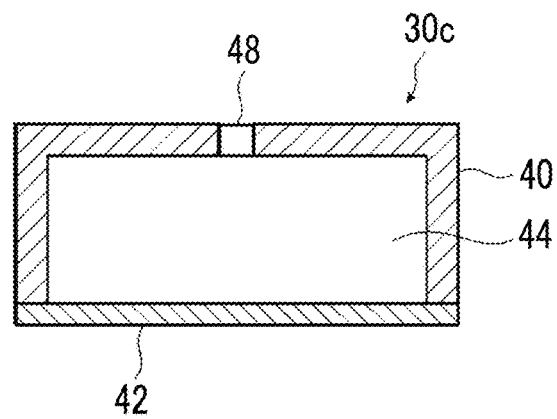
FIG. 10 is a cross-sectional view schematically showing still another example of the silencer.

In addition, as a method of making the resonance characteristic of the silencer the weak resonance characteristic, there is a method of providing a through-hole or a gap communicating with the inner space of the silencer. For example, the air column resonator 30b shown in FIG. 9 has a configuration in which a second opening portion 39 that communicates with the inside of the resonance pipe 37 is provided on the closed surface side of the resonance pipe 37. Alternatively, the film type resonator 30c shown in FIG. 10 has a second opening portion that communicates the back space 44 to the outside on the back side of the frame 40. As described above, in a case in which the resonator has the second opening portion, the resonator is disposed at a position at which the second opening portion is not connected to the inner space of the axial fan. Note that, in the examples shown in FIGS. 9 and 10, the air column resonator or the film type resonator has been used as the resonator, but in a case of the Helmholtz resonator as well, a configuration may be adopted in which the second opening portion that communicates with the inner space is provided. In addition, a portion need only be formed in which the sound can be exchanged with the outside, instead of the through-hole, such as creating a gap in a case of attaching the rear plate, or using a porous penetrating plate as the rear plate.

The size, the position, the number, entire opening ratio, and the like of the second opening portions need only be appropriately set such that the sum of the absorbance and the reflectivity at the resonance frequency of the silencer is 10% to 43%, and the standardized half-width is more than 0.05 and 0.25 or less.

In addition, as a method of making the resonance characteristic of the silencer the weak resonance characteristic, there is a method of narrowing the flow passage inside the silencer. For example, in a case of the air column resonator, an inner diameter of the resonance pipe is reduced. Similarly, a slit width of the air column resonator on a slit side is reduced. In addition, in a case of the Helmholtz resonator, a diameter of the opening portion is reduced.

The flow passage does not have to be uniformly narrow, and may be a structure that gradually narrows or a structure that expands. A tapered structure often has a superiority in mold-based manufacturing.

The diameter, angle, and the like of the inner flow passage need only be appropriately set such that the sum of the absorbance and the reflectivity at the resonance frequency of the silencer is 10% to 43%, and the standardized half-width is more than 0.05 and 0.25 or less.

Here, in the example shown in FIG. 1, the configuration has been adopted in which the silencer 30 is disposed outside the casing 16 and is connected to the inner space 17 of the axial fan 12 via the through-hole 15 formed in the outer frame portion 16b of the casing 16, but the present invention is not limited to this.

Figure 11:
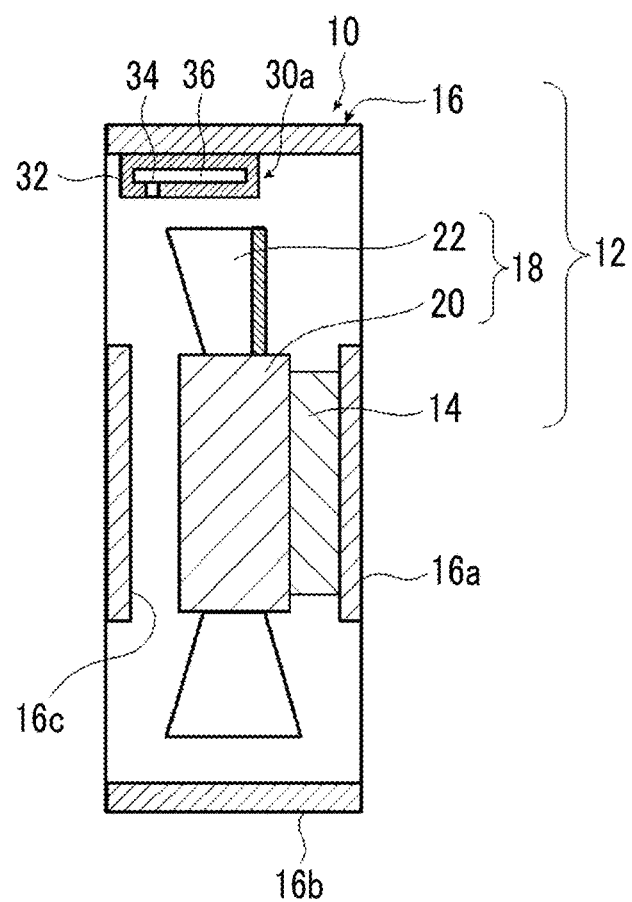
FIG. 11 is a cross-sectional view schematically showing still another example of the blower with the silencer according to the embodiment of the present invention.

For example, as shown in FIG. 11, the silencer 30 (Helmholtz resonator 30a in the shown example) may be disposed in the inner space 17 of the axial fan 12.

Figure 12:
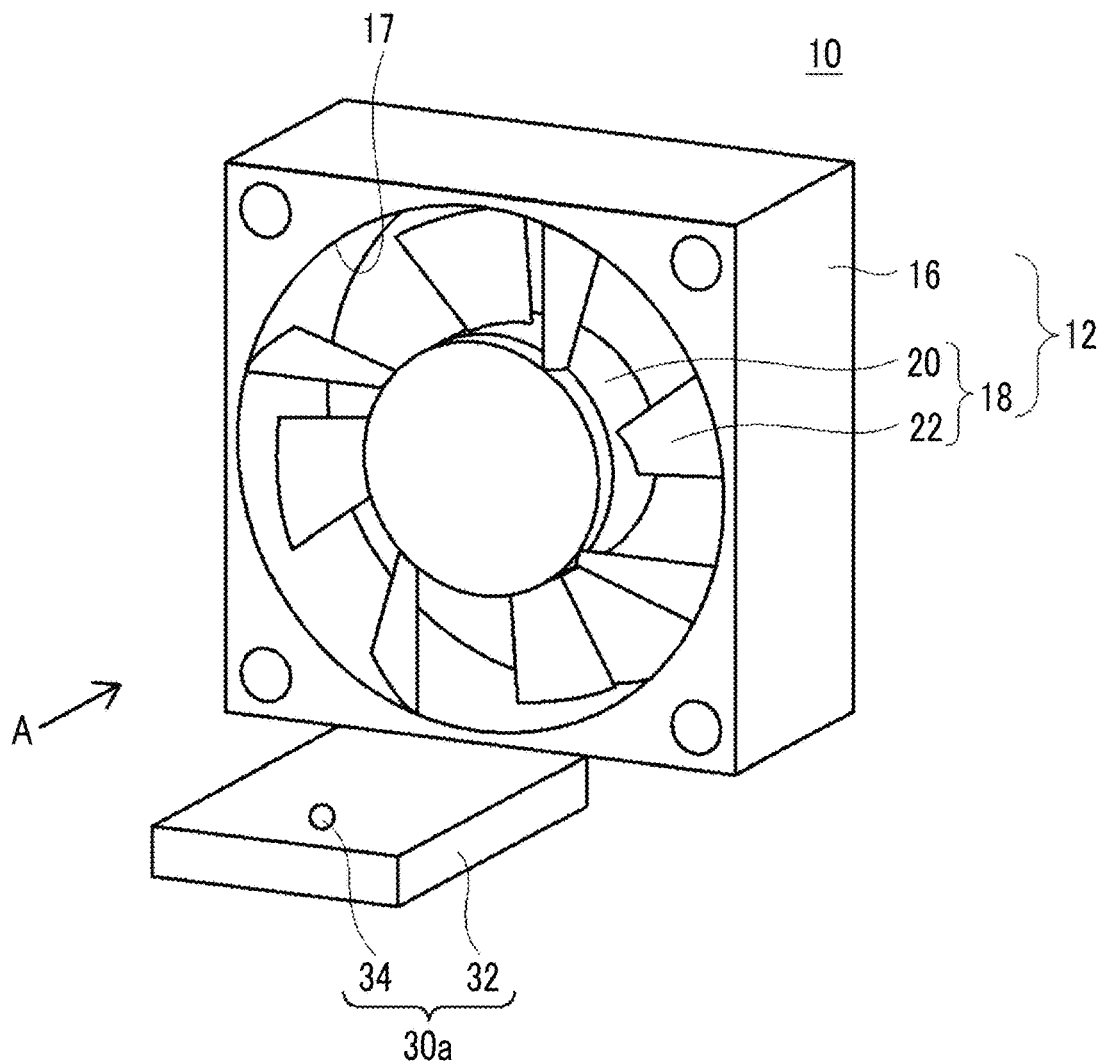
FIG. 12 is a perspective view schematically showing still another example of the blower with the silencer according to the embodiment of the present invention.

In addition, the silencer 30 need only be disposed at a position connected to the sound field space of the sound generated by the fan. Therefore, as shown in FIG. 12, a configuration may be adopted in which the silencer 30 is disposed outside the casing 16 and is disposed at a position not connected to the inner space 17 of the axial fan 12. In the example shown in FIG. 12, the Helmholtz resonator 30a is disposed on a downstream side of the axial fan 12 in a blowing direction. In addition, the Helmholtz resonator 30a is disposed at a position in which blowing by the axial fan 12 is not blocked, specifically, around a region serving as an air duct for the wind blown by the axial fan 12. In addition, in the Helmholtz resonator 30a, the opening portion 34 is disposed such that the axial fan 12 faces the axial direction.

From the viewpoint of air permeability, it is preferable that the silencer 30 be disposed at a position that does not overlap with the region formed by the rotation of the rotor blade 18 as viewed from the axial direction of the axial fan 12.

In addition, since the blower with the silencer according to the embodiment of the invention of the present application can obtain the silencing effect even in a case in which a strong wind blows, the silencer 30 can be suitably disposed to be connected to the inner space of the axial fan 12. Therefore, the entire size (volume) can be reduced.

In addition, as shown in FIG. 1, the blower with the silencer according to the embodiment of the present invention may include a plurality of silencers.

In addition, the blower with the silencer according to the embodiment of the present invention may include different types of silencers.

Here, the axial fan 12 rotates the rotor blade having the plurality of blades to impart the kinetic energy to the gas and blow the gas in the axial direction. Therefore, the axial fan 12 generates a sound of which a sound pressure is a maximum value at a specific frequency which is determined by the rotation speed and the number of blades. In the following description, the sound of the axial fan 12 of which the sound pressure is a maximum value at a specific frequency which is determined by the rotation speed and the number of blades is referred to as a discrete frequency sound.

Specifically, the discrete frequency sound is a sound having a tone-to-noise ratio (TNR) defined by the European standard ECMA-74 as a prominent discrete tone or a prominence ratio (PR) of 3 dB or more.

As described above, the axial fan 12 generates the sound of which the sound pressure is the maximum value at a specific frequency. Here, in the present invention, it is preferable that the resonance frequency measured by the acoustic pipe of the silencer deviate from the frequency of the discrete frequency sound by 1% to 10%.

Generally, the resonator sets the resonance frequency to be substantially the same as the frequency of the sound to be silenced (discrete frequency sound), thereby using the resonance phenomenon to silence the sound (discrete frequency sound) at that frequency.

On the other hand, in the present invention, the configuration is adopted in which the resonance frequency of the silencer deviates from the frequency of the discrete frequency sound by 1% to 10%, so that the silencing effect can be further obtained by using cancellation by interference by using the phase change at a slightly deviated frequency in the vicinity of the resonance frequency. As a result, even in a case in which the wind continues to blow on the surface of the resonance structure of the resonator and the resonance is suppressed, the sound can be effectively silenced.

The resonance frequency of the silencer deviates from the frequency of the discrete frequency sound by preferably 2% to 8%, more preferably −3% to 5%, and still more preferably 3% to 4%. Note that the frequency deviation is represented by "|frequency of discrete frequency sound−resonance frequency of silencer|/frequency of discrete frequency sound".

The resonance frequency of Helmholtz resonator 30*a* is determined by a volume of the inner space 36 surrounded by the case 32, an area and a length of the opening portion 34, and the like. Therefore, the frequency of the resonating sound can be appropriately set by adjusting the volume of the inner space of the case 32 of the Helmholtz resonator 30*a*, the area and the length of the opening portion 34, and the like.

In addition, the resonance frequency of the air column resonator 30*b* is determined by a length of the resonance pipe and the like. Therefore, the frequency of the resonating sound can be appropriately set by adjusting the depth of the resonance pipe, the size of the opening, and the like.

In addition, the resonance frequency of the film type resonator 30*c* is determined by the size (size of the vibration surface, that is, a size of the opening portion of the frame 40), the thickness, the hardness, and the like of the film 42. Therefore, the frequency of the resonating sound can be appropriately set by adjusting the size, the thickness, the hardness, and the like of the film 42.

Note that in a case in which a configuration is adopted in which the resonator has the inner space and the through-hole (opening portion) which communicates the inner space to the outside, whether a resonance structure causing air column resonance or a resonance structure causing Helmholtz resonance is provided is determined in response to the size and position of the through-hole, the size of the inner space, and the like. Therefore, by adjusting the above appropriately, it is possible to select whether the air column resonance or the Helmholtz resonance is adopted as the resonance structure.

On the other hand, in the case of Helmholtz resonance, it is necessary to generate thermal viscous friction at the through-hole, and thus it is preferable that the opening portion be narrow to a certain extent. Specifically, in a case in which the through-hole has a rectangular shape, the length of the short side is preferably 0.5 mm or more and 20 mm or less, more preferably 1 mm or more and 15 mm or less, and still more preferably 2 mm or more and 10 mm or less. In a case in which the through-hole has a circular shape, it is preferable that the diameter be in the range described above.

In addition, in a case in which the axial fan 12 generates a plurality of discrete frequency sounds, the silencer 30 need only include a silencer of which the resonance frequency deviates from at least one discrete frequency sound by 1% to 10%. It is more preferable that the silencer 30 include a silencer that satisfies the resonance frequency condition described above with respect to each of the plurality of discrete frequency sounds.

Note that, it is preferable to use the resonator having the flow passage communicating with the inner space 17 of the axial fan 12 as the resonator. That is, it is preferable to use the Helmholtz resonator 30*a* or the air column resonator 30*b* as the resonator. As described above, the resonance frequency of the film type resonator 30*c* depends on the size of the film 42 (vibration surface). Specifically, it is necessary to increase the size of the film 42 (vibration surface) in order to adjust the resonance frequency of the film type resonator 30*c* to a low frequency. However, the adjustment of the resonance frequency is difficult in a range of the size that can be disposed on (connected to) the axial fan 12. On the other hand, in a case of the Helmholtz resonator 30*a* and the air column resonator 30*b*, the flow passage (opening portion) that communicates with the inner space 17 need only be provided, and the resonance frequency can be adjusted without increasing the opening portion itself. Therefore, for example, even in a case in which the resonance frequency is adjusted to a low frequency, the connection to the inner space 17 of the axial fan 12 can be easily performed.

Here, in a case in which the silencer 30 is connected to a position at which the sound pressure of the sound pressure distribution at the frequency of the discrete frequency sound caused by the axial fan 12 is high, it is preferable that the resonance frequency of the silencer deviate from the frequency of the discrete frequency sound to a lower side by 1% to 10%. In addition, in a case in which the silencer 30 is connected to a position at which the sound pressure of the sound pressure distribution at the frequency of the discrete frequency sound caused by the axial fan 12 is low, it is preferable that the resonance frequency of the silencer deviate from the frequency of the discrete frequency sound to a higher side by 1% to 10%.

The resonance of the silencer 30 is moved from a low frequency to a high frequency around the resonance frequency by a phase of 180 degrees (reflected sound phase). Since the resonator having a wide resonance width is used in the present invention, this phase change also gradually occurs in a wide frequency width. By designing a combination of an appropriate reflected sound phase and the discrete frequency sound, it is possible to select the interference relationship between the sound radiated from the sound source (fan blade) and the cancellation and to obtain the silencing effect.

It is inferred that, in a case in which the silencer 30 is connected to a position at which the sound pressure of the sound pressure distribution at the frequency of the discrete frequency sound caused by the axial fan 12 is high, in a case in which the resonance frequency of the silencer deviates from the frequency of the discrete frequency sound to a lower side, the transmission of the reflected sound phase from the resonator in a state of being delayed from the resonance frequency in the frequency of the discrete frequency sound causes the phase relationship of cancellation of the sound passing through the fixed blade other than the disposition position of the silencer. On the other hand, in a case in which the silencer 30 is connected to a position at which the sound pressure of the sound pressure distribution at the frequency of the discrete frequency sound caused by the axial fan 12 is low, the resonance frequency of the silencer deviates from the frequency of the discrete frequency sound to a higher side, and the reflected sound phase is transmitted in a state of being advanced from the resonance frequency. Since it can be inferred that the phases are different between the position at which the sound pressure is high and the position at which the sound pressure is low, it is considered appropriate to reverse the phase design of the silencer in order to perform cancellation.

It is generally known that, in a case in which the axial fan is disposed in a duct, a mode is formed in the axial direction, that is, the sound pressure distribution occurs. In addition, according to the examination by the present inventors, it has been found that the sound pressure distribution occurs in the circumferential direction in the inner space of the axial fan. The cause of the sound pressure distribution in the circumferential direction in the inner space of the axial fan is presumed that, in the axial fan 12, the casing 16 has the support portion 16a in order to dispose the rotor blade 18 and the motor 14 at the center in the radial direction, and has the fixed blade 16d (or a connecting portion that does not have a function of blade) in order to connect the support portion 16a with the outer frame portion 16b. Each of blades 22 is an aerodynamic sound source, and the sound is radiated by the pressure fluctuation on the surface thereof. The radiated sound hits the fixed blade 16d present in the immediate vicinity (distance sufficiently smaller than the wavelength of the sound) and is restricted. That is, since a plurality of sound sources that are moved with rotation are present and the fixed blade 16d is provided in the immediate vicinity thereof, complicated acoustic interference occurs, the propagation of sound waves is biased in the circumferential direction, and the sound pressure distribution in the circumferential direction occurs. In particular, in order to prevent the increase in the sound radiated from the blades, the number of fixed blades and the number of rotor blades are mostly different, so that the number of sound sources and the number of fixed portions are different, and complicated interference occurs.

Therefore, in the present invention, the connection position of the silencer can be set in the circumferential direction in accordance with the sound pressure distribution at the frequency of the discrete frequency sound caused by the axial fan 12, in addition to the axial direction.

In particular, in a case in which the axial fan 12 has the fixed blade 16d, the bias of the sound pressure distribution in the circumferential direction is further increased. Similarly, in a case in which the fixed blade 16d is disposed on the downstream side of the air flow generated by the rotation of the rotor blade 18, the bias of the sound pressure distribution in the circumferential direction is further increased.

In addition, in a case in which the axial fan 12 has the fixed blades 16d and the number of blades of the rotor blade 18 is equal to or more than the number of blades of the fixed blades 16d, the bias of the sound pressure distribution in the circumferential direction is further increased.

In a case in which the number of blades of the rotor blade 18 is equal to or more than the number of blades of the fixed blade 16d, as viewed from the axial direction, in the space (fixed blade opening portion) between the blades of the adjacent fixed blades 16d, a timing at which a plurality of blades of the rotor blade 18 are present occurs. Since each of the blades of the rotor blade 18 can be regarded as the sound source, two sound sources are present in one fixed blade opening portion. In that case, it is considered that the sound waves generated from the respective sound sources interact with each other in the fixed blade opening portion due to interference or the like, so that the bias of the sound pressure distribution in the circumferential direction in one fixed blade opening portion is further increased.

Figure 13:
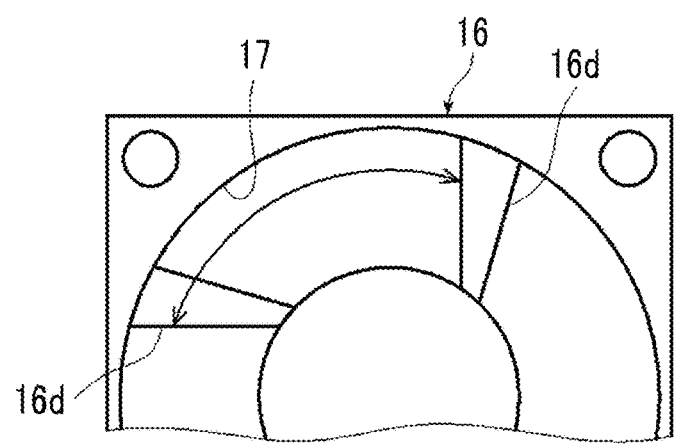
FIG. 13 is a partially enlarged view of a casing.
Figure 14:
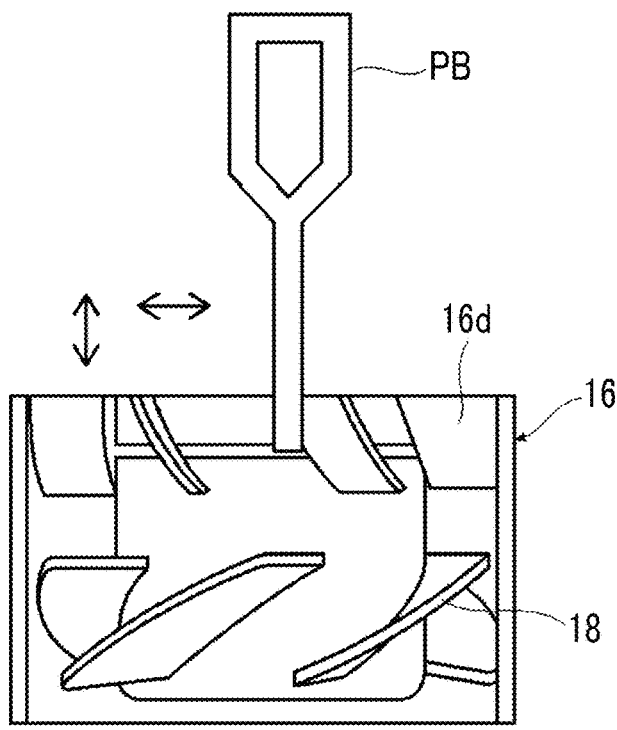
FIG. 14 is a diagram conceptually showing an example of a measuring method of a sound pressure distribution.

The sound pressure distribution in the inner space of the axial fan (hereinafter, also referred to as the sound pressure distribution of the axial fan) can be measured by, for example, performing scanning with a probe microphone PB, which measures the sound pressure, in the fixed blade opening portion in the circumferential direction (right-left direction in FIG. 14) and the axial direction (up-down direction in FIG. 14) as shown in FIG. 14 in a state of operating the axial fan in the space (fixed blade opening portion) between the blades of the adjacent fixed blades 16d as shown in FIG. 13.

Figure 15:
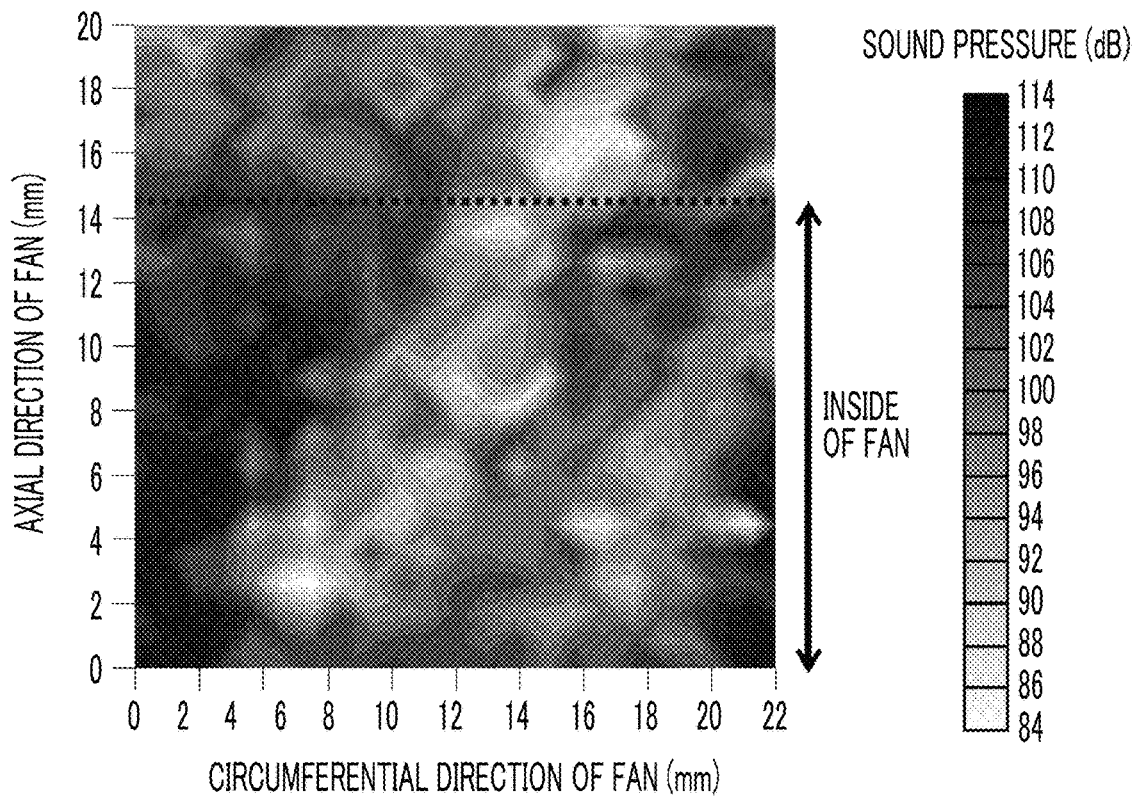
FIG. 15 is a graph showing an example of measurement results of the sound pressure distribution.

An example of measuring the sound pressure distribution of the axial fan as described above is shown in FIG. 15. As shown in FIG. 15, it is found that the sound pressure distribution having the position at which the sound pressure is high and the position at which the sound pressure is low occurs in the axial fan in the circumferential direction.

The probe microphone PB has a probe attached to a distal end of the microphone. For example, the probe is a member having a hole diameter of 1.5 mm, an outer diameter of 2.5 mm, and a sleeve length of 50 mm. This probe microphone PB is inserted into the inner space of the axial fan and measures the sound pressure. By using a thin probe, it is possible to reduce the influence on the wind and it is possible to measure the sound pressure at a local position.

Here, having the sound pressure distribution in the circumferential direction of the axial fan means a case in which the difference between the maximum value and the minimum value of the sound pressure in the circumferential direction sound pressure distribution is 6 dB or more. The sound pressure need only be obtained from the average value by performing measurement 5 times or more for each point, and the difference between the maximum value and the minimum value.

In addition, in a case in which the maximum value of the sound pressure in the sound pressure distribution in the circumferential direction is denoted by $P_{max}$ and the minimum value is denoted by $P_{min}$, the position of the axial fan in the circumferential direction at which the sound pressure is high is a position having the sound pressure equal to or more than $P_{max}-0.4\times(P_{max}-P_{min})$. In addition, the position at which the sound pressure is low is a position having the sound pressure equal to or less than $P_{min}+0.4\times(P_{max}-P_{min})$.

Here, in a case in which the plurality of silencers are provided, a configuration may be adopted in which each silencer 30 is connected to the position of the axial fan 12 at which the sound pressure is high, and the resonance frequency of the silencer deviates from the frequency of the discrete frequency sound to a lower side. Alternatively, a configuration may be adopted in which each silencer 30 is connected to the position of the axial fan 12 at which the sound pressure is low, and the resonance frequency of the silencer deviates from the frequency of the discrete frequency sound to a higher side. Alternatively, a configuration may be adopted in which each silencer 30 is connected to the position of the axial fan 12 at which the sound pressure is high or the position of the axial fan 12 at which the sound pressure is low, and the resonance frequency of the silencer deviates from the frequency of the discrete frequency sound to a lower side or a higher side.

In addition, in a case in which the axial fan 12 has a plurality of fixed blades 16*d*, it is preferable that the silencers be connected to at least two fixed blade opening portions between the adjacent fixed blades 16*d*, and it is more preferable that the silencers be connected to all the fixed blade opening portions.

In the following, the components of the silencer will be described.

Examples of materials of the frame, the case, and the resonance pipe of the film type resonator, the Helmholtz resonator, and the air column resonator (hereinafter, collectively referred to as a "frame material") include a metal material, a resin material, a reinforced plastic material, a carbon fiber, and the like. Examples of the metal material include metal materials, such as aluminum, titanium, magnesium, tungsten, iron, steel, chromium, chromium molybdenum, nichrome molybdenum, copper, and alloys thereof. In addition, examples of the resin material include resin materials, such as an acrylic resin, polymethyl methacrylate, polycarbonate, polyamide-imide, polyarylate, polyetherimide, polyacetal, polyether ether ketone, polyphenylene sulfide, polysulfone, polyethylene terephthalate, polybutylene terephthalate, polyimide, an acrylonitrile, butadiene, styrene copolymer synthetic resin (ABS resin), polypropylene, and triacetyl cellulose. In addition, examples of the reinforced plastic material include carbon fiber reinforced plastics (CFRP), and glass fiber reinforced plastics (GFRP). In addition, natural rubber, chloroprene rubber, butyl rubber, ethylene/propylene/diene rubber (EPDM), silicone rubber, and the like, and rubber containing these crosslinked structures are exemplary examples.

In addition, as the frame material, various honeycomb core materials can be used. Since the honeycomb core material is lightweight and used as a highly rigid material, ready-made product thereof is easily available. As the frame, it is possible to use the honeycomb core material made of various materials such as aluminum honeycomb core, FRP honeycomb core, paper honeycomb core (manufactured by Shin Nippon Feather Core Co., Ltd., manufactured by Showa Aircraft Industry Co., Ltd., and the like), a thermoplastic resin (PP, PET, PE, PC, and the like) honeycomb core (TECCELL manufactured by Gifu Plastic Industry Co., Ltd., and the like).

In addition, a structure containing air, that is, a foam material, a hollow material, a porous material, or the like can also be used as the frame material. In order to prevent the ventilation between cells in a case in which a large number of resonators are used, for example, a closed cell foam material and the like can be used to form the frame. For example, various materials such as closed cell polyurethane, closed cell polystyrene, closed cell polypropylene, closed cell polyethylene, and a closed cell rubber sponge can be selected. By using closed cell material, sound, water, gas, or the like is not allowed to pass through, and the structural strength is high as compared with an open cell material, and thus it is suitable for being used as the frame material. In addition, in a case in which the porous sound absorbing body described above has sufficient supportability, the frame may be formed only by the porous sound absorbing body, and examples of the porous sound absorbing body and the material of the frame are used in combination by for example, mixing or kneading. As described above, the weight of the device can be reduced by using the material system including air inside. In addition, a heat insulating property can be imparted.

Here, from the viewpoint of disposition at a high temperature position, it is preferable that the frame material be made of a material having higher heat resistance than the flame retardant material. The heat resistance can be defined, for example, by the time that satisfies each item of Article 108-2 of the Building Standards Law Enforcement Ordinance. In a case in which the time that satisfies each item of Article 108-2 of the Building Standards Law Enforcement Ordinance is 5 minutes or more and less than 10 minutes, it is a flame retardant material, in a case in which the time is 10 minutes or more and less than 20 minutes, it is a semi-incombustible material, and in a case in which the time is 20 minute or more, it is a non-combustible material. Note that, in many cases, the heat resistance is defined for each field. Therefore, the frame material need only be made of a material having the heat resistance equivalent to or higher than the flame retardance defined in the field in response to the field in which the blower with the silencer is used.

The wall thicknesses of the frame and the case (frame thickness) are not particularly limited, and can be set in response to, for example, the size of the opening cross section of the frame.

Examples of the film 42 include various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and the resin materials such as polyethylene terephthalate (PET), triacetyl cellulose (TAC), polyvinylidene chloride (PVDC), polyethylene (PE), polyvinyl chloride (PVC), polymethylpentene (PMP), cycloolefin polymer (COP), zeonoa, polycarbonate, polyethylene naphthalate (PEN), polypropylene (PP), polystyrene (PS), polyarylate (PAR), aramid, polyphenylene sulfide (PPS), polyether sulfone (PES), nylon, polyester, cyclic olefin copolymer (COC), diacetyl cellulose, nitro cellulose, cellulose derivative, polyamide, polyamide-imide, polyoxymethylene (POM), polyetherimide (PEI), polyrotaxane (slide ring material or the like), and polyimide. Further, a glass material such as thin film glass and a fiber reinforced plastic material, such as carbon fiber reinforced plastics (CFRP) and glass fiber reinforced plastics (GFRP), can also be used. In addition, natural rubber, chloroprene rubber, butyl rubber, EPDM, and silicone rubber, and rubber having these crosslinked structures can be used. Alternatively, a combination thereof may be used.

In addition, in a case in which the metal material is used, the surface may be metal-plated from the viewpoint of suppressing rust.

From the viewpoint of excellent durability against heat, ultraviolet rays, external vibration, or the like, it is preferable to use the metal material as the material of the film 42 in applications requiring durability.

In addition, a fixing method of the film to the frame is not particularly limited, and a method of using a double-sided tape or an adhesive, a mechanical fixing method such as screwing, crimping or the like can be appropriately used. The fixing method can also be selected from the viewpoints of heat resistance, durability, and water resistance as in the case of the frame material and the film. For example, as the adhesive, "Super X" series manufactured by CEMEDINE Co., Ltd., "3700 series (heat resistant)" manufactured by ThreeBond Holdings Co., Ltd., heat resistant epoxy adhesive "Duralco series" manufactured by TAIYO WIRE CLOTH CO., LTD., and the like can be selected. In addition, as the double-sided tape, Ultra High Temperature Double Coated Tape 9077 manufactured by 3M or the like can be selected. As described above, various fixing methods can be selected for the required characteristic.

The thickness of the film 42 is preferably less than 100 μm, more preferably 70 μm or less, and still more preferably 50 μm or less. Note that in a case in which the thickness of the film 42 is not uniform, an average value thereof need only be in the range described above. On the other hand, in a case in which the thickness of the film is too thin, it is difficult to be treated. A film thickness is preferably 1 μm or more, and more preferably 5 μm or more.

A Young's modulus of the film 42 is preferably 1000 Pa to 1000 GPa, more preferably 10000 Pa to 500 GPa, and most preferably 1 MPa to 300 GPa.

A density of the film 42 is preferably 10 kg/m$^3$ to 30000 kg/m$^3$, more preferably 100 kg/m$^3$ to 20000 kg/m$^3$, and most preferably 500 kg/m$^3$ to 10000 kg/m$^3$.

In addition, in the film type resonator, the thickness of the back space 44 is preferably 10 mm or less, more preferably 5 mm or less, and still more preferably 3 mm or less. Note that in a case in which the thickness of the back space is not uniform, an average value thereof need only be in the range described above.

Note that a method of attaching the silencer (resonator) to the casing of the axial fan is not particularly limited, and a known fixing method such as a method using an adhesive, a pressure sensitive adhesive, a double-sided tape, and a mechanical method such as screwing can be used as appropriate.

In addition, the back space 44 of the film type resonator 30c need only be substantially partitioned to inhibit the air flow, and may have an opening in a part of the film 42 or the frame 40, without being the completely closed space. Such a form providing the opening in a part thereof is preferable from the point that a change in the sound absorption characteristic as a gas in the back space is expanded or contracted due to a temperature change, tension is applied to the film 42, and the hardness of the film 42 is changed can be prevented.

By forming a through-hole in the film 42, propagation due to air propagation sound occurs. Due to the above, the acoustic impedance of the film 42 is changed. In addition, the mass of the film 42 is reduced due to the through-hole. Due to the above, the resonance frequency of the film type resonator 30c can be controlled. A position in which the through-hole is formed is not particularly limited.

Here, in the example shown in FIG. 1 and the like, a configuration is adopted in which the blower with the silencer includes the axial fan 12 as the fan and the noise of the axial fan (propeller fan) is suppressed, but the present invention is not limited to this, and a known fan in the related art, such as a sirocco fan, a turbo fan, a centrifugal fan, or a line flow fan (registered trademark), can be applied to the fan.

The sirocco fan takes in air from the rotation axis direction of the rotor including blade, supplies the air in the direction perpendicular to the rotation axis, and has the blowing port on the side surface. Therefore, for example, in a case in which the fan is the sirocco fan, the silencer need only be disposed to be in contact with the blowing port. In this case, it is preferable that the silencer be disposed at the position at which the blowing port of the sirocco fan is not blocked.

Even in a case of other fans such as the sirocco fan, it is preferable to dispose the fan in the blowing passage of the fan in order to effectively silence the sound in a case of silencing the sound generated by the fan, but the silencer is affected by the wind, so that the silencing effect by the resonance is reduced and the wind noise is amplified. On the other hand, by disposing the weak silencer, the amplification of the wind noise can be suppressed and the sound generated by the fan can be suitably silenced.

In addition, the blower with the silencer having the same structure as the structure described above can be applied to a helicopter comprising the propeller fan as the axial fan and the moving object with the propeller, such as the UAV. That is, it is possible to realize the moving object with the propeller comprising the blower with the silencer described above. With this moving object with the propeller, the noise generated by the rotation of the propeller during flight can be suitably silenced. Particularly during flight, since a person is mainly present below the moving object with the propeller (propeller exhaust side), it is important to silence the noise below the moving object, and such noise can be suitably silenced with the silencer described above.

Note that, in the moving object with the propeller, it is desirable that the silencer of the blower with the silencer be disposed at the position at which the noise can be suitably silenced, and for example, the silencer may be disposed around the propeller which is the main sound source.

In a case in which the description will be made with a multicopter type moving object 50 with the propeller shown in FIG. 30 as an example, one silencer 30 may be disposed in the vicinity of each of a plurality of (for example, four) propellers 52. In this case, by disposing the silencer 30 on the outside of each propeller 52 in the radial direction (side farther away from a body 54 of the moving object), the silencer 30 can be configured as a part of a propeller guard 56. The propeller guard 56 is a frame disposed on the outside of each propeller 52 in the radial direction for the purpose of preventing contact with each propeller 52.

In addition, an outer shape of the silencer 30 used in the moving object 50 with the propeller (specifically, a case 33 of the silencer 30) may be a circle or an arc as viewed from the rotation axis direction of the propeller 52. That is, in the propeller guard 56, the silencer 30 disposed on the periphery of each propeller 52 may be bent along the circumferential direction of each propeller 52 as shown in FIG. 30. In this case, the silencer 30 satisfactorily exerts a function as the propeller guard 56, and can cause the wind generated by the propeller to flow without inhibition.

Figure 28:
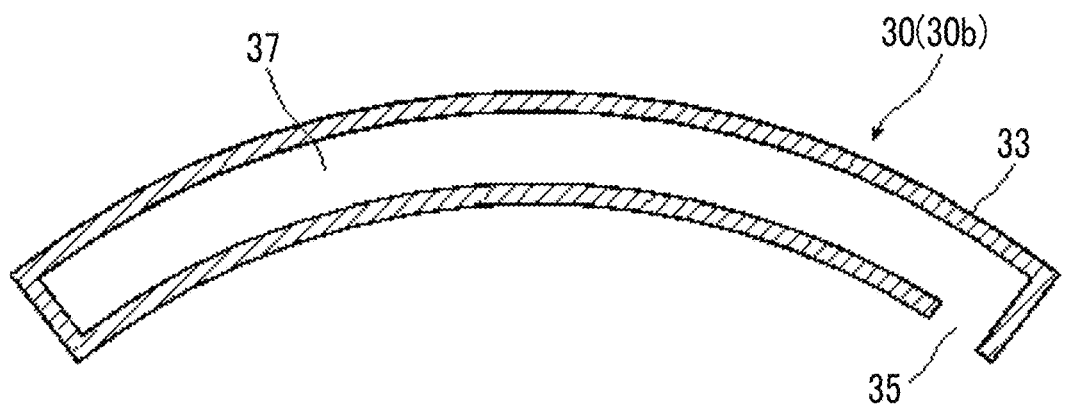
FIG. 28 is a cross-sectional view of the silencer mounted on the moving object with the propeller.

The type of the silencer 30 used in the moving object 50 with the propeller is not particularly limited, but may be, for example, the air column resonator 30b as shown in FIG. 28. FIG. 28 is a diagram showing a cross section of the air column resonator 30b, strictly speaking, a cross section orthogonal to the rotation axis of the propeller 52.

As described above, the air column resonator 30b may be bent in an arc shape along the circumferential direction of the propeller 52 for the reason of exerting the function as the propeller guard 56. That is, in a case in which the air column resonator 30b is viewed from the rotation axis direction of the propeller 52, at least a part of a resonance pipe 37 formed inside the case 33 of the silencer 30 may be bent in an arc shape along the circumferential direction of the propeller 52.

Note that, as shown in FIG. 28, the resonance pipe 37 may be bent in an L shape. More specifically, in the case 33 bent in an arc shape, an opening portion 35 is provided at a position facing the nearest propeller 52. That is, inside the case 33, a portion bent in an arc shape and a portion extending from one end part of the arc toward the opening portion 35 are present, and these portions intersect each other in an L shape to form the resonance pipe 37.

EXAMPLES

The present invention will be described below in more detail with reference to examples. The materials, the usage amounts, the ratios, the processing contents, the processing procedures, and the like shown in the following examples can be appropriately changed without departing from the spirit of the present invention. Therefore, the scope of the present invention should not be construed as being limited by the following examples.

[Axial Fan]

San Ace 60 (Model: 9GA0624P1G03 manufactured by SANYO DENKI CO., LTD.) was prepared as the axial fan. This axial fan had the casing having the outer shape of 60 mm×60 mm and the thickness of 38 mm, in which the number of blades of the fixed blade was five and the number of blades of the rotor blade was seven. In a case in which a rated current was applied to this axial fan, a basic mode of a fan peak sound (discrete frequency sound) appeared in the vicinity of 1800 Hz.

[Sound Pressure Distribution of Axial Fan]

The sound pressure distribution in the inner space of the axial fan was measured as follows.

A custom-made probe (the hole diameter was 1.5 mm, the outer diameter was 2.5 mm, and the sleeve length was 50 mm) was attached to the distal end of the microphone (4152N, manufactured by ACO Co., Ltd.) to manufacture the probe microphone PB. In a state of operating the axial fan, the manufactured probe microphone PB was inserted into the fixed blade opening portion of the axial fan as shown in FIG. 14, and scanning in the circumferential direction and the axial direction was performed to measure the sound pressure. The sound pressure at each measurement point was measured by setting an initial position in the circumferential direction to the vicinity of the fixed blade and an initial position in the axial direction to a position away from the rotor blade by 1 mm, moving the probe microphone PB in the circumferential direction at 1 mm intervals, performing the scanning in the circumferential direction, moving the probe microphone PB to the front side in the axial direction (side opposite to the rotor blade) by 1 mm after the scanning in the circumferential direction was completed, and performing the scanning in the circumferential direction again. As described above, the sound pressure in the fixed blade opening portion was measured by repeating the movement in the circumferential direction and the axial direction.

By extracting the sound pressure of the basic discrete frequency sound at each measurement point and plotting the sound pressure at each measurement position, a spatial distribution of the sound pressure at the discrete frequency (1.8 kHz) was shown (FIG. 15). Note that the sound pressure of the discrete frequency sound was removed by regarding the peripheral sound pressure as the sound pressure due to the wind noise as the background to obtain the sound pressure of the discrete frequency sound.

An area indicated as the inside of the fan in FIG. 15 was inside the fixed blade opening portion, and the blades of the fixed blade were present at both ends in the circumferential direction. From FIG. 15, it was found that there was a coarse/fine distribution of the sound pressure over 30 dB in the circumferential direction of the axial fan. The sound pressure was high in the vicinity of the fixed blade and the sound pressure was low in the vicinity of the center of the fixed blade opening portion. As described above, the sound pressure distribution in the circumferential direction of the inner space of the axial fan was determined by actual measurement.

Example 1

As the silencer, an air column resonator made of vinyl chloride and having one-sided closed pipe (the outer diameter was 10 mm, the inner diameter was 6 mm, and the inner length (resonance pipe length) was 48 mm) with a gap between a closed surface and a vinyl chloride pipe was used. This was realized by roughly cutting the vinyl chloride pipe in a case of cutting. The resonance frequency measured by the acoustic pipe of this air column resonator was 1736 Hz.

Figure 16:
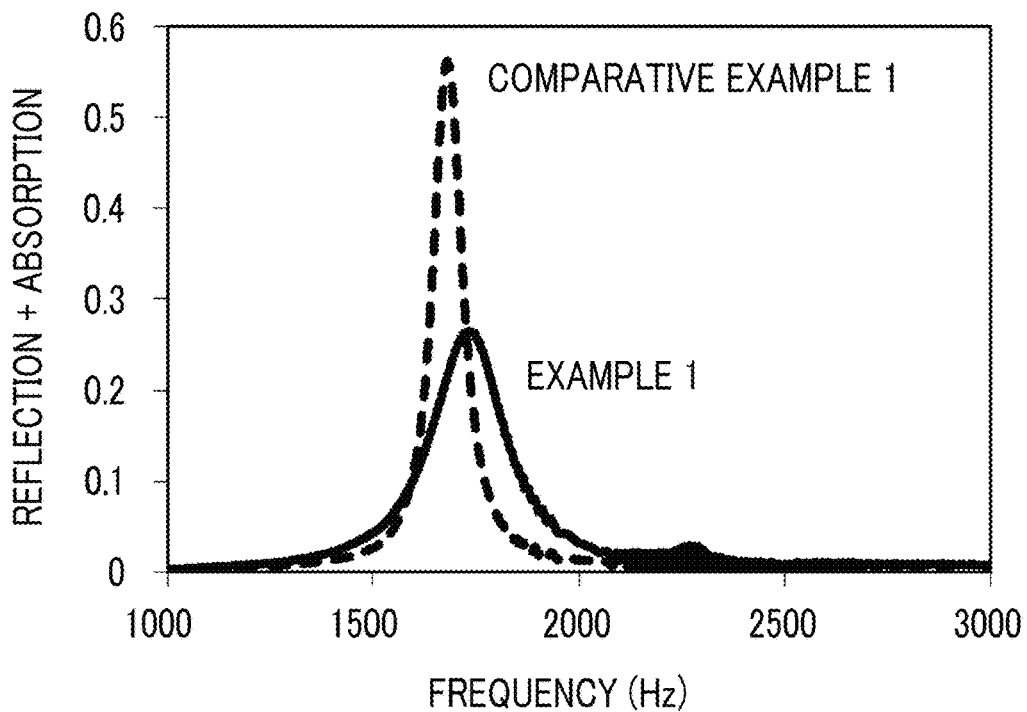
FIG. 16 is a graph showing a relationship between a frequency and an absorbance+a reflectivity.

The reflection and absorption performance of the silencer was measured by the 4-microphone method using the acoustic pipe. The measuring method of the transmittance and the reflectivity was performed according to ASTM E2611, and WinZac MTX manufactured by Nihon Onkyo Engineering Co., Ltd. could be used for the same measurement. FIG. 16 shows the results. Using the acoustic pipe of 60 mm square, which was the same as the inner size of the fan, the air column resonator was disposed inside and the measurement was performed. The opening portion of the resonance pipe was disposed to face the substantially sound source side. As shown in FIG. 16, the sum of the absorbance and the reflectivity at the resonance frequency of the silencer was about 26%, the half-width was about 212 Hz, and the standardized half-width was 0.12.

According to the measurement results of the sound pressure distribution, the air column resonator was connected to the position of the axial fan at which the sound pressure was high (in the vicinity of the fixed blade (circumferential direction, axial direction)=(3 mm, 13 mm)). Note that this position was the position equal to or more than $P_{max}-0.4\times(P_{max}-P_{min})$ with respect to the maximum value $P_{max}$ and the minimum value $P_{min}$ of the sound pressure in the sound pressure distribution in the circumferential direction. Since, in the axial fan, the number of blades of the fixed blade was five and the number of blades of the rotor blade was seven, there were also five fixed blade opening portions. Therefore, one air column resonator was connected to each of the five fixed blade opening portions.

The casing was provided with the opening (through-hole) having a diameter of 10 mm at the portion into which the air column resonator was inserted.

By inserting the air column resonator into each through-hole of the casing, the blower with the silencer having five air column resonators was manufactured. The end part of the air column resonator was adjusted not to protrude to the inner space of the axial fan. In a state of protruding to the inside of the fan, the wind hits the corners of the air column resonator and the wind noise was likely to be generated, so that it was desirable not to block the air duct.

Comparative Example 1

The same procedure as in Example 1 was performed by using the air column resonator made of vinyl chloride and having one-sided closed pipe (the outer diameter was 10 mm, the inner diameter was 6 mm, and the inner length (resonance pipe length) was 48 mm) as the silencer except that there was no gap in the closed portion of the vinyl chloride pipe. That is, the silencer was the same as the air column resonator used in Example 1 except for the gap of the closed portion. The resonance frequency of this air column resonator was 1680 Hz.

The reflection and absorption performance of the silencer was measured in the same manner as in Example 1. FIG. 16 shows the results. As shown in FIG. 16, the sum of the absorbance and the reflectivity at the resonance frequency of the silencer was about 0.56%, the half-width was about 84 Hz, and the standardized half-width was 0.3.

[Evaluation]

The noise volumes (sound pressures) of the manufactured blowers with silencers in example and comparative example were measured. In addition, as Reference Example 1, the noise volume (peak frequency 1800 Hz) of the axial fan alone was measured. In addition, the noise volume was measured in a state in which the input power was changed and the peak frequency was changed to 1900 Hz (Reference Example 2).

Figure 17:
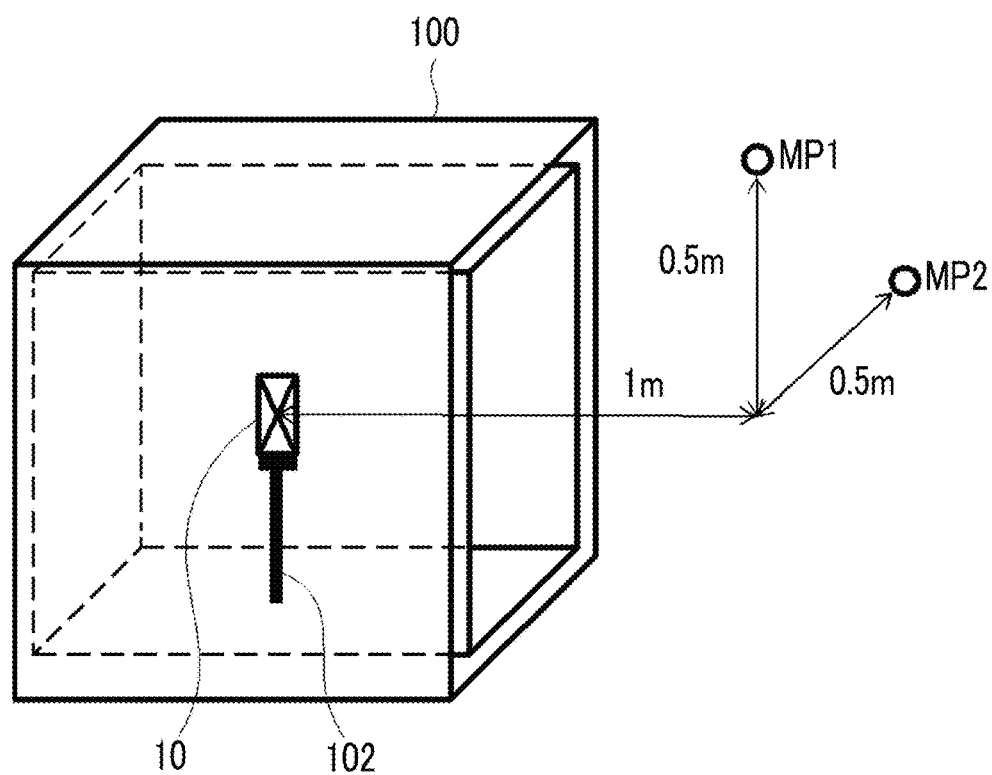
FIG. 17 is a diagram for describing a measuring method of a noise volume in Examples.

As shown in FIG. 17, a 1 m square box having two empty front and rear surfaces was manufactured by an acrylic plate having a thickness of 10 mm, and a sound absorbing urethane (not shown) having a thickness of 10 cm was attached to the entire inner side surface to manufacture a measurement box 100. At the center of the measurement box 100, the blower 10 with the silencer was disposed using a base 102. The direction of the air flow generated by the axial fan was disposed in accordance with an open surface of the measurement box 100. A microphone MP1 (4152N, manufactured by ACO Co., Ltd.) was disposed at a position away from the axial fan to the exhaust side in the axial direction by 1 m and to the upper side in the vertical direction by 0.5 m, and a microphone MP2 (4152N, manufactured by ACO Co., Ltd.) was disposed at a position away to the exhaust side in the axial direction by 1 m and in the horizontal direction by 0.5 m.

Figure 18:
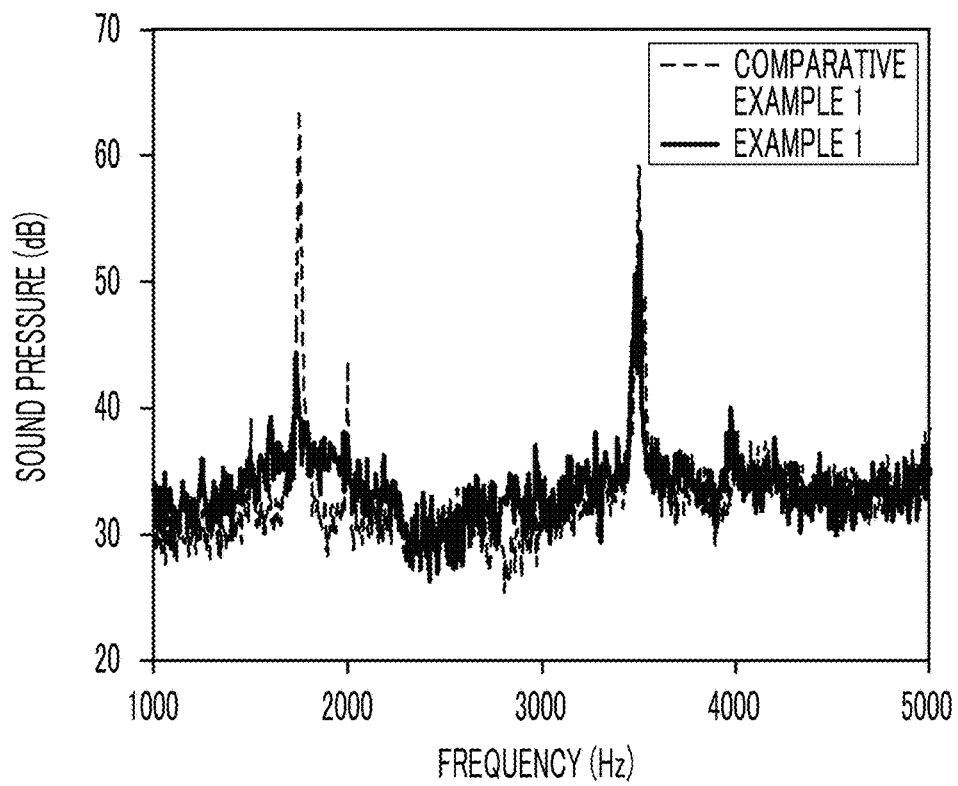
FIG. 18 is a graph showing a relationship between the frequency and a sound pressure.
Figure 19:
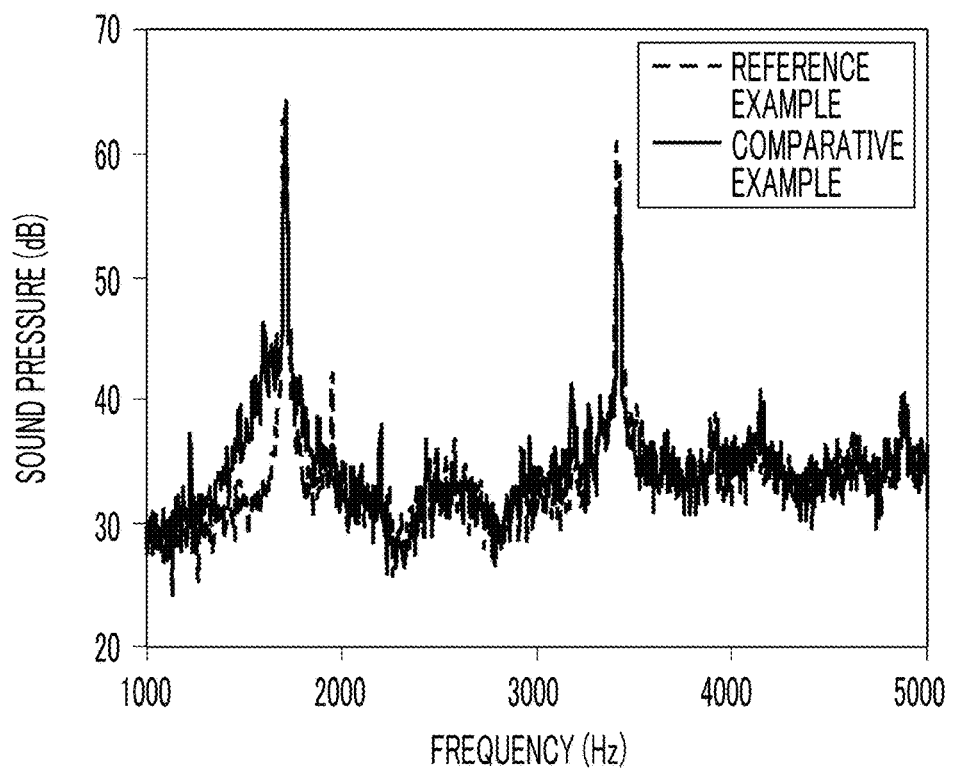
FIG. 19 is a graph showing the relationship between the frequency and the sound pressure.

The fan was operated and the noise volume was evaluated using the average value of the sound pressures measured by the two microphones. FIGS. 18 and 19 show the results.

From the comparison between Comparative Example 1 and Reference Example 1 in FIG. 19, it was found that a large silencing effect was not obtained for the target discrete frequency sound of about 1800 Hz. In addition, at the frequency in the vicinity of the discrete frequency sound, the sound pressure was higher than that of Reference Example. This was caused by the generation of the wind noise.

On the other hand, from the comparison between Example 1 and Reference Example 1 in FIG. 18, it was found that a large silencing effect could be obtained for the discrete frequency sound of about 1800 Hz in the vicinity of the resonance frequency. In addition, it was found that the sound pressure was not increased in the vicinity of the discrete frequency, and the generation of the wind noise could be suppressed. Further, it was found that the silencing effect of higher-order second-order discrete frequency sounds could be obtained. That is, it was found that the silencing effect could be obtained at a higher frequency in addition to at the frequency in the vicinity of the resonance frequency of the resonator, and it was found that a peculiar effect that was advantageous for silencing the axial fan was exhibited.

In addition, it was confirmed that the blower with the silencer of Example 1 had no change in the wind speed and the air volume as compared with the original axial fan (Reference Example 1).

Example 2

Figure 21:
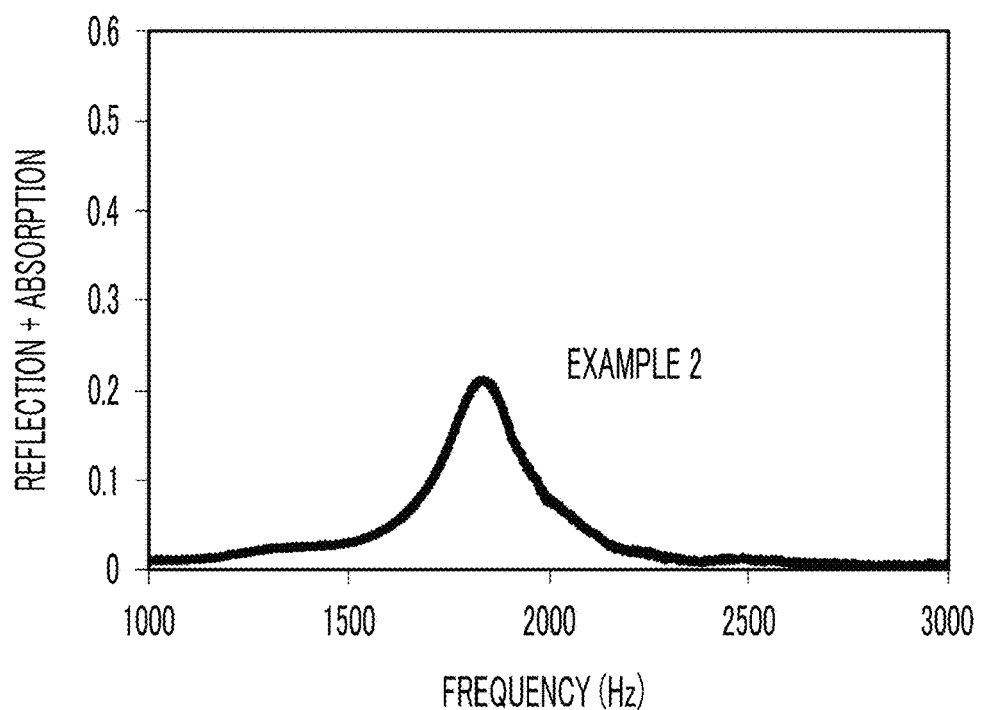
FIG. 21 is a graph showing the relationship between the frequency and the reflectivity+the absorbance.

Instead of the air column resonator used in Example 1, an L-shaped air column resonator (made of ABS resin, the one-sided closed pipe structure, 48 mm of the flow passage length (resonance pipe length)) with the opening portion positioned at a position bent 90° with respect to the resonance pipe was used. The resonance frequency of this air column resonator was 1826 Hz. In addition, the reflection and absorption performance of the silencer was measured in the same manner as in Example 1. FIG. 21 shows the results. As shown in FIG. 21, the sum of the absorbance and the reflectivity at the resonance frequency of the silencer was about 21%, and the half-width was about 234 Hz. The standardized half-width was 10.6.

The air column resonator was attached to the through-hole of the casing of the axial fan such that an extending direction of the resonance pipe was the axial direction. Since the casing was the same as in Example 1, the air column resonator was connected to the position of the axial fan in the circumferential direction at which the sound pressure was high (in the vicinity of the fixed blade (circumferential direction, axial direction)=(3 mm, 13 mm)). By attaching the L-shaped air column resonator as the air column resonator to the axial fan such that the extending direction of the resonance pipe was the axial direction, the area of the entire blower with the silencer viewed from the axial direction could be made smaller and more compact than in Example 1.

[Evaluation]

Figure 20:
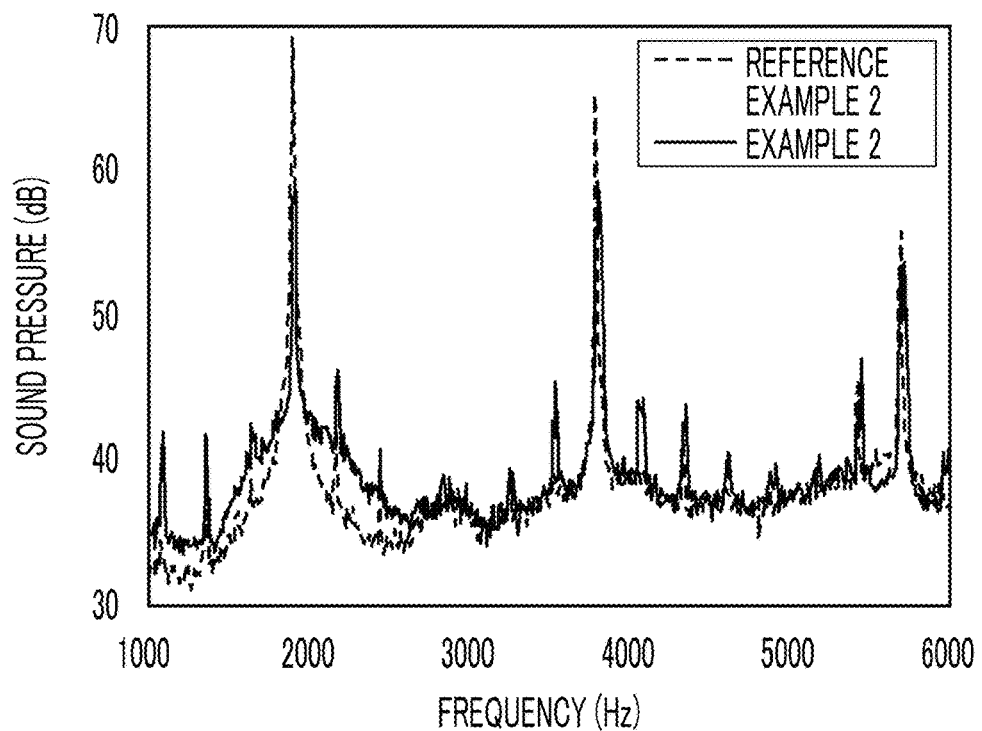
FIG. 20 is a graph showing the relationship between the frequency and the sound pressure.

The noise volume was measured by the same method as above except that the input power was changed and the peak frequency was changed to 1900 Hz. FIG. 20 shows the results.

From the comparison between Example 2 and Reference Example 2 of FIG. 20, it was found that a large silencing effect could be obtained for the discrete frequency sound of about 1900 Hz in the vicinity of the resonance frequency. Further, it was found that the silencing effect of higher-order second-order and third-order discrete frequency sounds could be obtained. Therefore, it was found that even the L-shaped air column resonator with a compact size exhibited the silencing effect.

In addition, it was confirmed that the blower with the silencer of Example 2 had no change in the wind speed and the air volume as compared with the original axial fan (Reference Example 2).

Example 3

Two through-holes (Φ1 mm) were made in the rear surface of the air column resonator made of vinyl chloride and having one-sided closed pipe (the outer diameter was 10 mm, the inner diameter was 6 mm, and the inner length (resonance pipe length) was 44 mm) (the through-holes were made in the acrylic plate by using a laser cutter).

Figure 22:
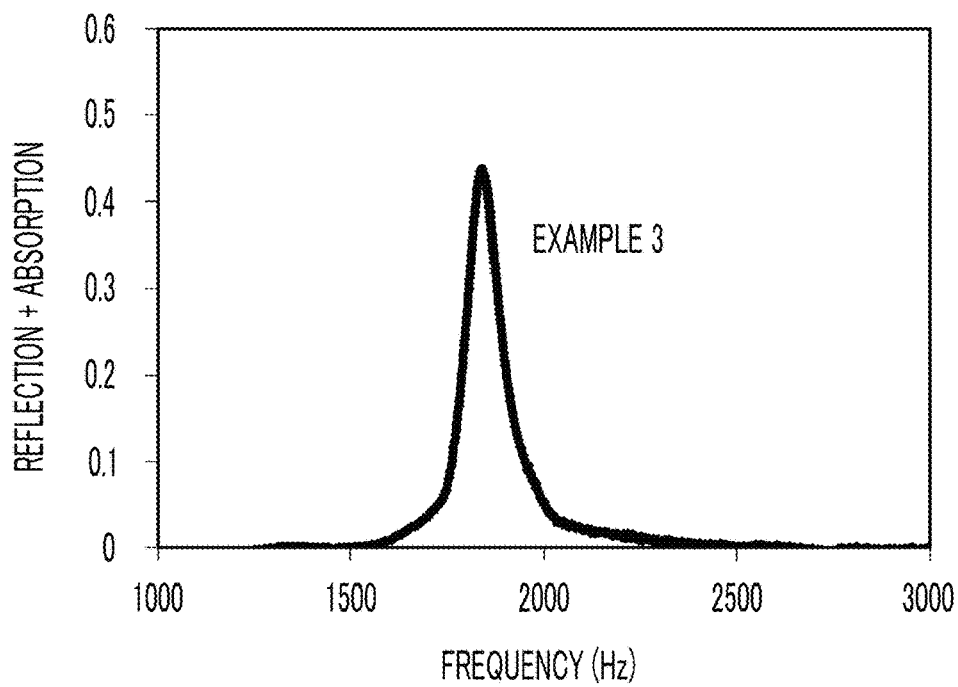
FIG. 22 is a graph showing the relationship between the frequency and the reflectivity+the absorbance.

The resonance frequency of this air column resonator was 1840 Hz. In addition, the reflection and absorption performance of the silencer was measured in the same manner as in Example 1. FIG. 22 shows the results. As shown in FIG. 22, the sum of the absorbance and the reflectivity at the resonance frequency of the silencer was about 43%, and the half-width was about 104 Hz. The standardized half-width was 14.5.

Figure 23:
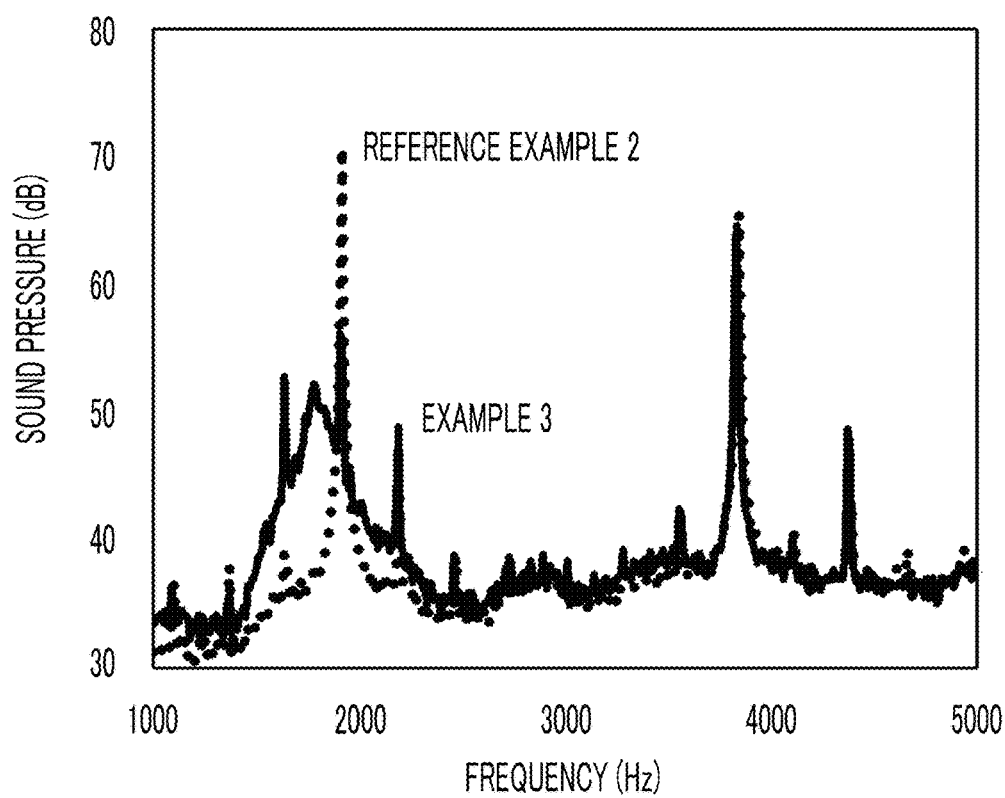
FIG. 23 is a graph showing a relationship between the frequency and a sound pressure level.

The measurement was performed by attaching the fan in the same disposition as in Example 1. FIG. 23 shows the noise spectrum. The peak was silenced by about 14 dB, and a large silencing effect was obtained. Note that there was a loud sound amplification region on the slightly lower frequency side of the peak. This corresponds to the wind noise caused by the resonance pipe, and it was found that a large wind noise was generated because the reflectivity+absorbance of the resonance was more than that of Examples 1 and 2.

[Simulation 1]

In the following, a relationship between the connection position of the silencer and the resonance frequency of the silencer was examined by simulation. The finite element method calculation software COMSOL Multiphysics (ver. 5.3, COMSOL Inc.) was used for the simulation.

A model of the inner space of the axial fan was created and the sound source was set to reproduce the phase of the fan. Five fixed blades and seven rotor blades were used in accordance with the axial fan used in examples.

Using this model, the sound pressure distribution in the inner space of the axial fan was calculated by the simulation. By the simulation, it was confirmed that, in the sound pressure distribution, the sound pressure was high on the periphery of the fixed blade and the sound pressure was low in the vicinity of the center of the fixed blade opening portion.

Note that the frequency was changed in a range of 1600 to 2000 Hz and the sound pressure spatial distribution was examined by the calculation, but it was confirmed that there was almost no difference in the distribution.

From this simulation result, the silencer was connected to the position at which the sound pressure was high in the sound pressure distribution of the discrete frequency sound (1800 Hz) of the fan. Modeling was performed by using the air column resonator as the silencer and providing two second opening portions having a diameter of 1 mm in the closed surface having the outer diameter of 10 mm, the inner diameter of 6 mm, and the inner length (resonance pipe length) of 48 mm such that the resonance frequency of the silencer was 1730 Hz.

Figure 24:
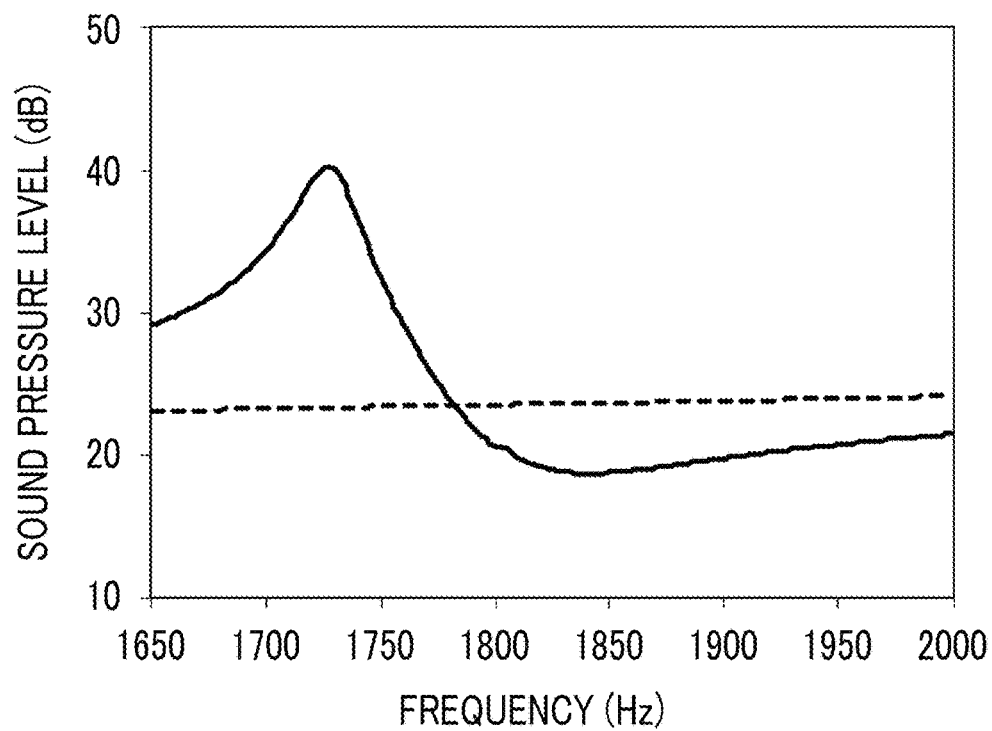
FIG. 24 is a graph showing the relationship between the frequency and the sound pressure level.

Using this simulation model, the sound pressures at a position away from the fan to the exhaust side in the axial direction by 1 m, a position away to the upper side in the vertical direction by 0.5 m, and a position away to the exhaust side in the axial direction by 1 m and in the horizontal direction by 0.5 m were calculated for each frequency to obtain the average value as the sound pressure level. FIG. 24 shows the results.

In this simulation, the phase distribution of the sound pressure radiation from the sound source was calculated assuming that it was the peak sound at each frequency. That is, the sound volume or silencing volume in a case in which the frequency was the peak sound (NZ sound of the fan) was shown for each frequency.

Figure 25:
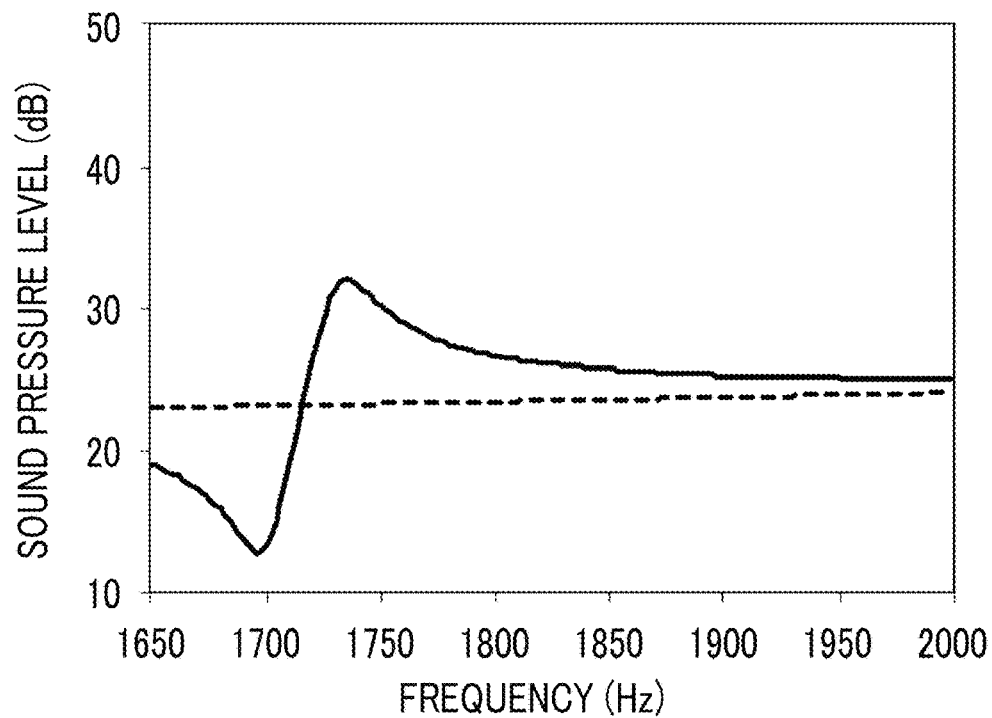
FIG. 25 is a graph showing the relationship between the frequency and the sound pressure level.

Similarly, the silencer was connected to the position at which the sound pressure was low in the sound pressure distribution of the discrete frequency sound (1800 Hz) of the fan, the sound pressure was calculated for each frequency, and the average value was obtained as the sound pressure level. FIG. 25 shows the results.

From FIG. 24, it was found that, in a case in which the silencer was connected to the position at which the sound pressure was high in the sound pressure distribution inside the fan, the sound pressure level of the noise at the frequency higher than the resonance frequency of the silencer (1730 Hz in FIG. 24, which was shown as the maximum noise in the simulation) could be made lower. Therefore, it was found that, in a case in which the silencer was connected to the position at which the sound pressure was high in the sound pressure distribution inside the fan, the discrete frequency sound of the fan could be more suitably silenced by making the resonance frequency of the silencer a lower frequency than the frequency of the discrete frequency sound of the fan.

On the other hand, from FIG. 25, it was found that, in a case in which the silencer was connected to the position at which the sound pressure was low in the sound pressure distribution inside the fan, the sound pressure level of the noise could be made lower at a lower frequency than the resonance frequency of the silencer. Therefore, it was found that, in a case in which the silencer was connected to the position at which the sound pressure was low in the sound pressure distribution inside the fan, the discrete frequency sound of the fan could be more suitably silenced by making the resonance frequency of the silencer a higher frequency than the frequency of the discrete frequency sound of the fan.

Example 4

Next, the relationship between the connection position of the silencer and the resonance frequency of the silencer was examined by using an actual machine.

Figure 26:
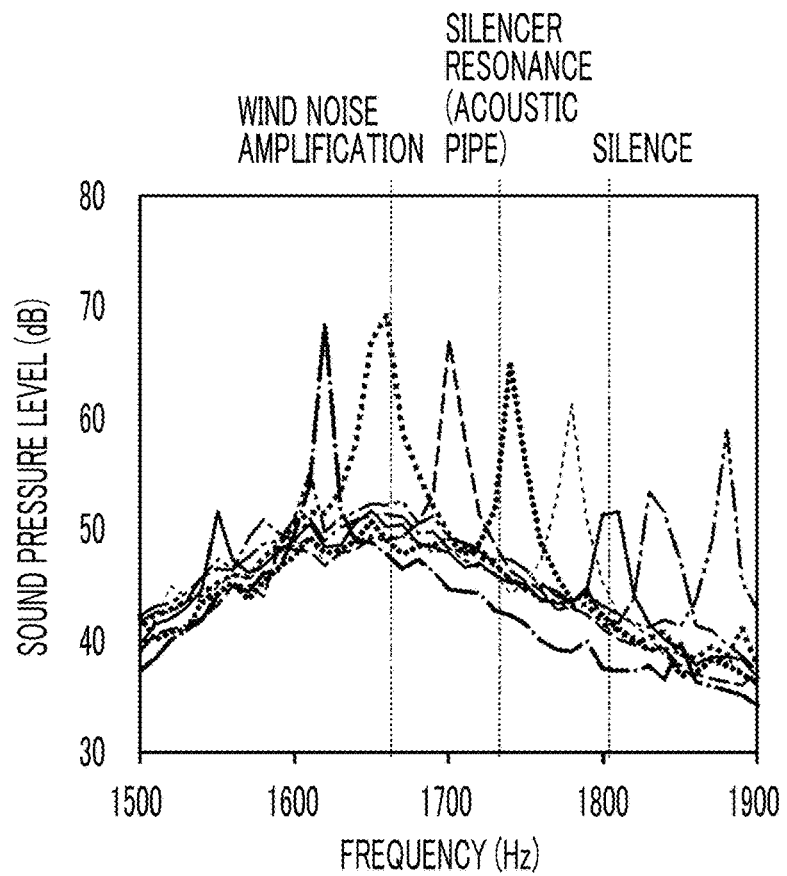
FIG. 26 is a graph showing the relationship between the frequency and the sound pressure level.

By using the blower with the silencer of Example 1, the rotation speed of the fan could be variously changed by changing the electric power, and the discrete frequency sound could be changed. The noise volume (sound pressure) of the blower with the silencer was measured for each rotation speed by the same method as in Example 1. FIG. 26 shows the relationship between the frequency and the noise volume (sound pressure level). The measurement was performed by changing rotation speed, that is, the discrete frequency sound from the vicinity of 1600 Hz to the vicinity of 1900 Hz. FIG. 26 shows the relationship between the frequency and the sound pressure level by changing a line type for each rotation speed.

A gentle peak centered around 1670 Hz showed the amplification of the wind noise due to the resonance of the silencer (air column resonator). There was almost no change even in a case in which the discrete frequency sound was changed.

On the other hand, there was a peak of about 20 dB in each measurement, which indicated the discrete frequency sound at each rotation speed. At the rotation speed shown by a solid line in FIG. 26, the peak height of this discrete frequency sound was lower than that of other rotation speeds. This indicated silencing the discrete frequency sound. In this case, silencing occurred in the vicinity of 1800 Hz.

In addition, the resonance frequency (1730 Hz) measured by the acoustic pipe was also shown by a line in FIG. 26.

From these, it was found that the relationship was that the amplification frequency of the wind noise (1670 Hz)<the resonance frequency due to the acoustic pipe (1730 Hz)<the silencing frequency of the discrete frequency sound (1800 Hz).

It was confirmed by an actual machine that the silencing frequency of the discrete frequency appeared on a higher frequency side than the resonance frequency of the silencer, which was matched with the prediction of the simulation.

Example 5

The air column resonator having an L shape was used to silence the noise generated by the propeller during drone flight. Specifically, the drone "Mavic Air 2" manufactured by DJI was used to perform the examination of silencing the peak noise during the flight. Specifically, silencing was examined in a state in which the drone was hovered and stopped at a position at which the height from the ground was 1.2 m.

In the examination of the silencing, first, a dedicated propeller guard was attached to the drone, and the sound pressure in a case in which the drone was flown in that state was measured. The measurement of the sound pressure was performed on a floor lined with sound absorbing material. Specifically, a microphone with a windshield was installed at a position 1.1 m below the drone and 0.2 m deviated in the lateral direction from the drone for the measurement. That is, the microphone was set at a position at which the height from the sound absorbing material was 10 cm. Note that the measurement of the sound pressure was performed by ¹⁄₂₄ octave band measurement.

Figure 27:
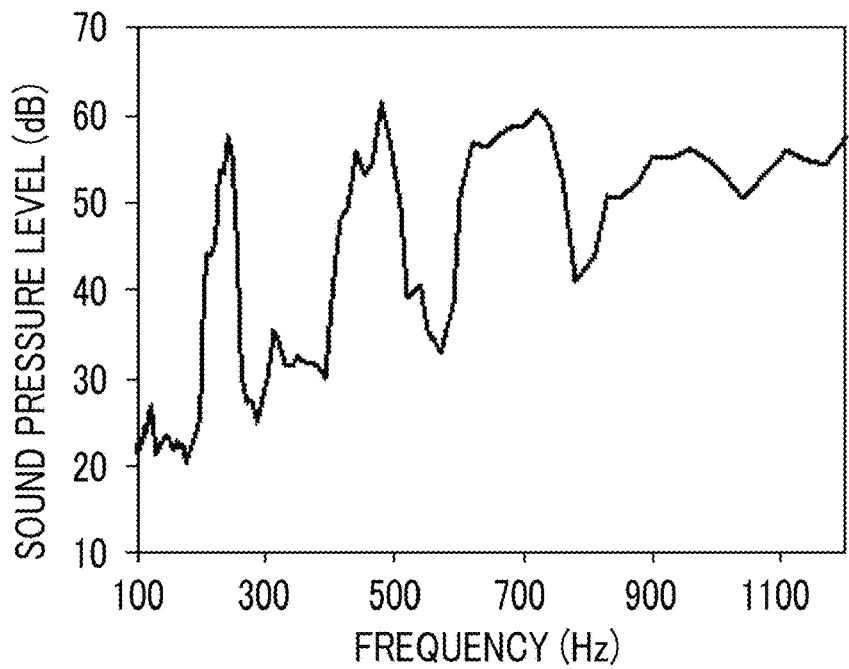
FIG. 27 is a graph showing measurement results of noise generated while a moving object with a propeller flies.

FIG. 27 shows the measurement results of the sound pressure. A vertical axis in FIG. 27 represents the sound pressure level (dBA). As can be seen from FIG. 27, the rotation of the propeller generated a large number of peak sounds. Specifically, a first peak sound was a sound of 227 Hz, the second peak sound was a sound of 453 Hz, and a higher-order peak sound having a frequency corresponding to an integral multiple of the sound was also generated.

Next, the air column resonator having an L shape was manufactured in order to silence the sound at a frequency of the second peak sound of 453 Hz. As shown in FIG. 28, this air column resonator was the arc-shaped resonator (indicated by reference numeral 30b in FIG. 28) in accordance with the shape of the propeller of the drone. In addition, the diameter of the propeller was 183 mm, the diameter of the inside (close side to the propeller) of the air column resonator 30b was 190 mm such that the propeller could be surrounded, the diameter of the outside (side away from the propeller) was 230 mm and the height was 11 mm. An inner edge and an outer edge of the air column resonator 30b were arcs, and the angle (center angle) of each arc was 100°. In addition, a sufficient length was ensured for air column resonance, and the air column resonator 30b could be easily attached by adjusting the angle between the frame of the dedicated propeller guard structure and the air column resonator 30b. Further, the above angle was determined not to cause extra vibration.

In addition, the arc-shaped opening portion 35 having an angle of 4° was provided at one end part of the case 33 of the air column resonator 30b. The width of the arc-shaped opening portion 35 (the length in the circumferential direction of the propeller) was 6.6 mm. By providing the opening portion 35, the resonance pipe 37 bent in an L shape was provided in the case 33. The thickness of the side wall of the case 33 was 2.5 mm, and the thickness of the upper wall and the lower wall was 1 mm, respectively. That is, in the resonance pipe 37 inside the case 33, the inner diameter was 192.5 mm, the outer diameter was 227.5 mm, in other words, the width was 17.5 mm. In addition, the height of the resonance pipe 37 was 9 mm.

An acrylic material was used to manufacture the air column resonator 30b. Specifically, an acrylic plate having a thickness of 1 mm was used for the upper wall portion and the lower wall portion, and an acrylic plate having a thickness of 3 mm was used for the other parts, the acrylic plates were cut by using the laser cutter and joined to have the above shape using an acrylic adhesive manufactured by Acrysunday Co., Ltd. As a result, the air column resonator 30b shown in FIG. 28 was manufactured.

Note that the weight of the air column resonator 30b was 15 g per unit, and 60 g for four units. On the other hand, since the weight of the dedicated propeller guard was 90 g, a relatively lightweight air column resonance structure could be realized.

Figure 29:
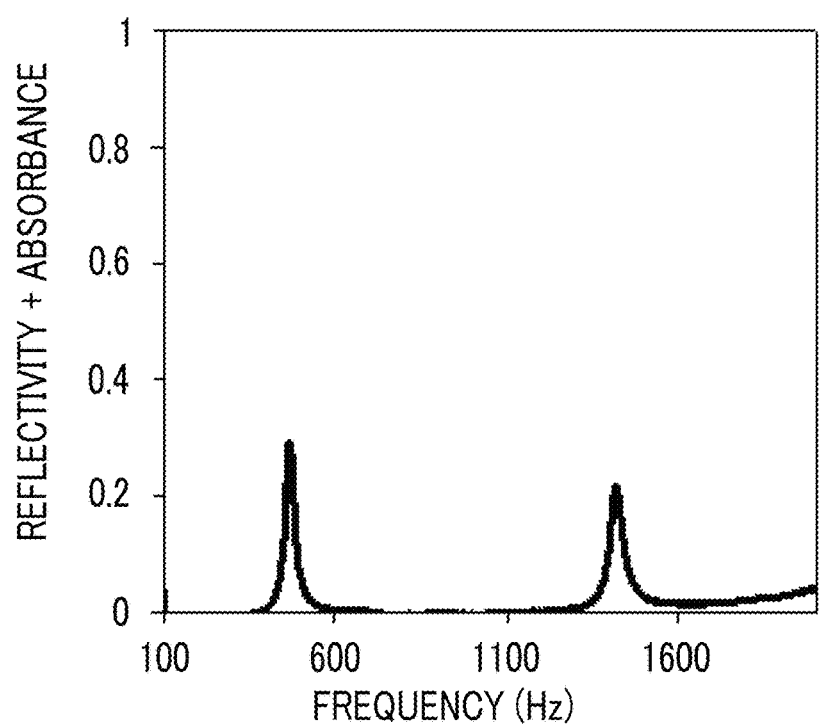
FIG. 29 is a graph showing a measurement result of an acoustic pipe performed on the silencer mounted on the moving object with the propeller.

The silencing effect of the air column resonator 30b was measured by using the acoustic pipe having a diameter of 8 cm. FIG. 29 shows the measurement results. The vertical axis in FIG. 29 represents the reflectivity+absorbance for the incident sound. As can be seen from FIG. 29, the first resonance of the air column resonator 30b occurred at a frequency of 468 Hz, and the reflectivity+absorbance at that frequency was 29.3%. In addition, the half-width was 32 Hz, and the standardized half-width was 0.068. These values satisfied the numerical conditions defined in the present invention. It was presumed that the above numerical values were realized by using the air column resonance structure having the resonance pipe 37 bent in an L shape in the middle.

Figure 30:
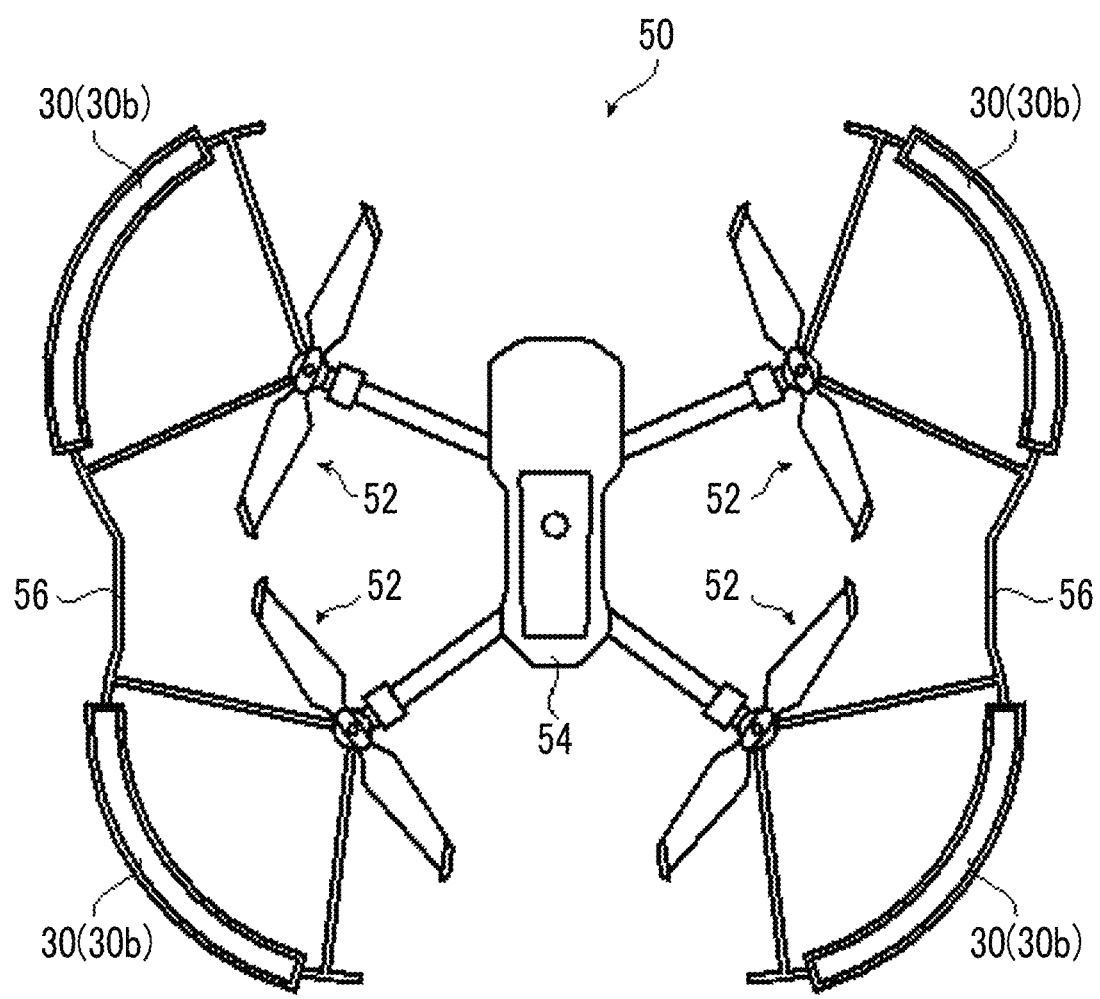
FIG. 30 is a plan view of the moving object with the propeller used for sound pressure measurement.

Next, the same number (specifically, four) of the air column resonators 30b as the propellers of the drone were manufactured, and as shown in FIG. 30, each air column resonator 30b was fixed to the upper part of the propeller guard 56 of the drone (moving object 50 with the propeller in FIG. 30). Moreover, the drone was flown and the sound pressure during the flight was measured. The position of the air column resonator 30b in this case was a position deviated from the propeller 52 of the drone to the air supply side (upper side) by about 1 cm.

Figure 31:
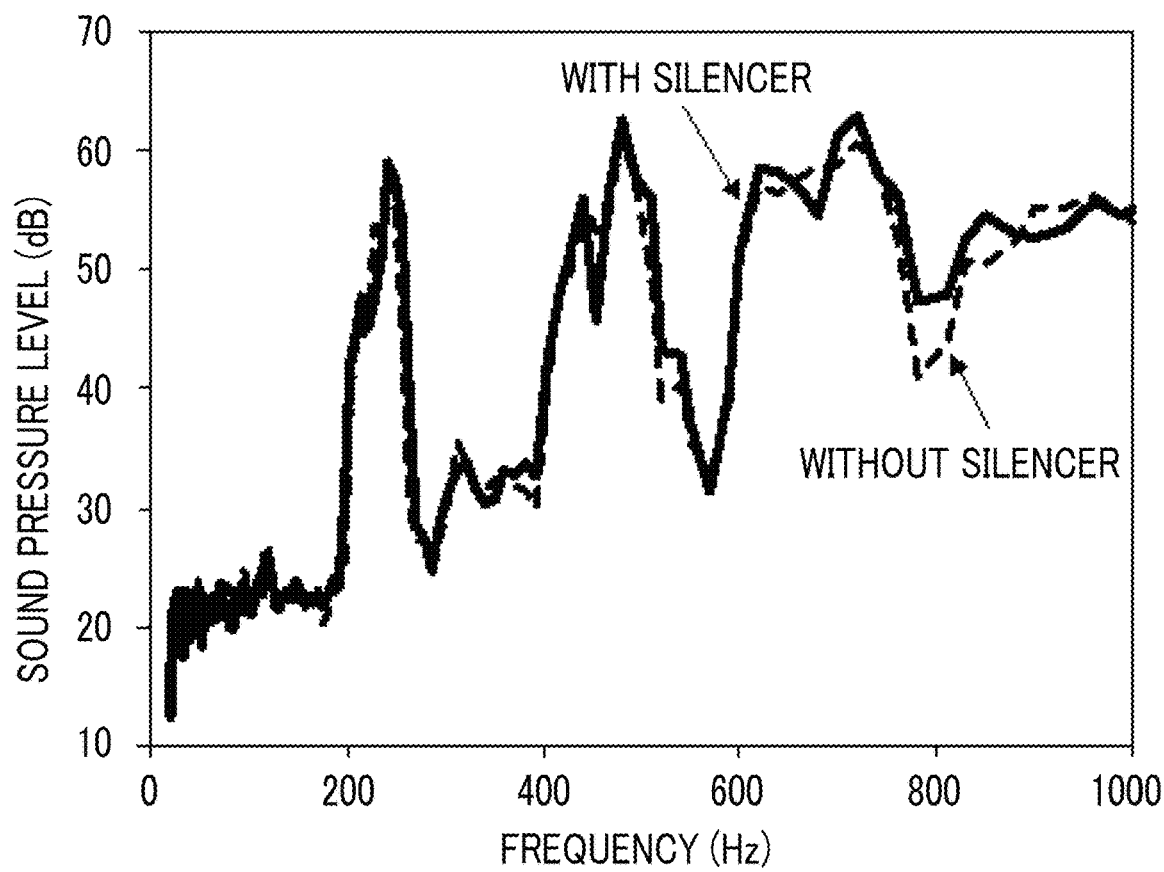
FIG. 31 is a graph showing a measurement result of the sound pressure performed by using the moving object with the propeller.

FIG. 31 shows the measurement results of the sound pressure. A dotted line in FIG. 31 is a graph in a case in which the air column resonator 30b was not used, and a solid line is a graph in a case in which the air column resonator 30b was fixed on the propeller guard 56. As can be seen from FIG. 31, a desired silencing effect could be obtained at a frequency of 453 Hz. Specifically, the sound pressure could be reduced from 53.1 dBA to 45.7 dBA, and the silencing effect of 7.4 dB could be obtained in the evaluation value in the ¹⁄₂₄ octave band. Note that, as described above, since the measurement position (microphone position) was below the drone, it was confirmed that the silencing the sound below the drone, which was a problem with the moving object with the propeller, such as the drone, could be realized.

Note that, in addition to the function of silencing the sound, each of the manufactured air column resonators 30b also functioned as a part of the propeller guard 56. That is, by surrounding the periphery of the propeller with the air column resonator 36b, it was possible to rectify the wind to facilitate the flow and prevent a person and an object from contacting with the rotating propeller 52.

Example 6

By fixing the drone instead of flying the drone, the measurement of the sound pressure was performed under the same conditions as in Example 5. In a case in which the propeller 52 was rotated in a state of fixing the drone, the peak sound was generated in the vicinity of 1400 Hz. Along with this, the air column resonator 30*b* was manufactured to silence the sound of 1400 Hz. The inner diameter, the outer diameter, and the height of the air column resonator 30*b* were the same as those in Example 5. On the other hand, the width of the opening portion 35 formed in the case 33 was set to 5 mm, and the angle (center angle) of the arc formed by the outer edge of the air column resonator 30*b* was set to 32°.

Figure 32:
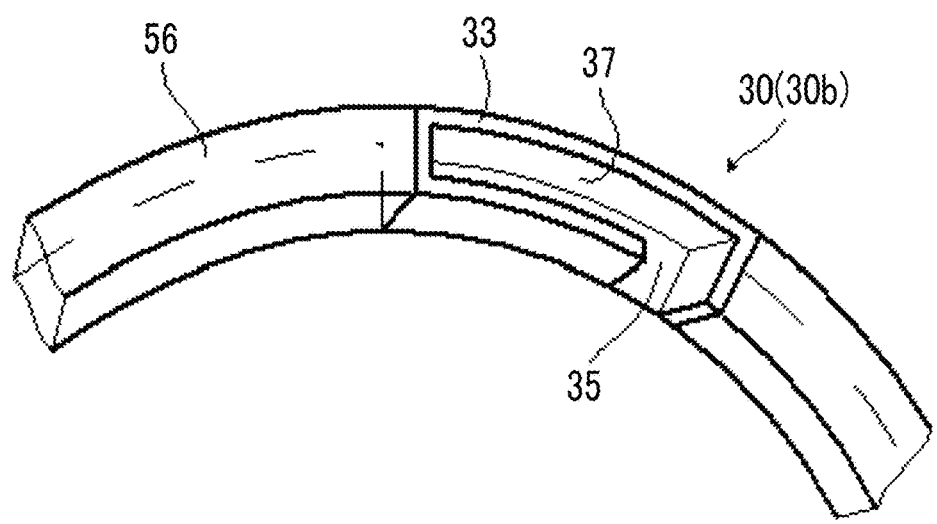
FIG. 32 is a diagram showing an air column resonator used in Examples.

With the air column resonator 30*b* as one unit (one unit), five air column resonators 30*b* were disposed side by side in an arc shape to manufacture the propeller guard consisting of the air column resonator 30*b*. FIG. 32 shows a part of the propeller guard of the manufactured air column resonator. In addition, in the opening portion 35 (entrance of the resonance pipe 37) of each air column resonator 30*b*, the sound absorbing body having a thickness of 5 mm consisting of a non-woven sound absorbing material "QonPET" manufactured by Bridgestone KBG Co., Ltd. was disposed to cover the opening portion 35. That is, in Example 6, the air column resonance structure with the sound absorbing body was manufactured.

Figure 33:
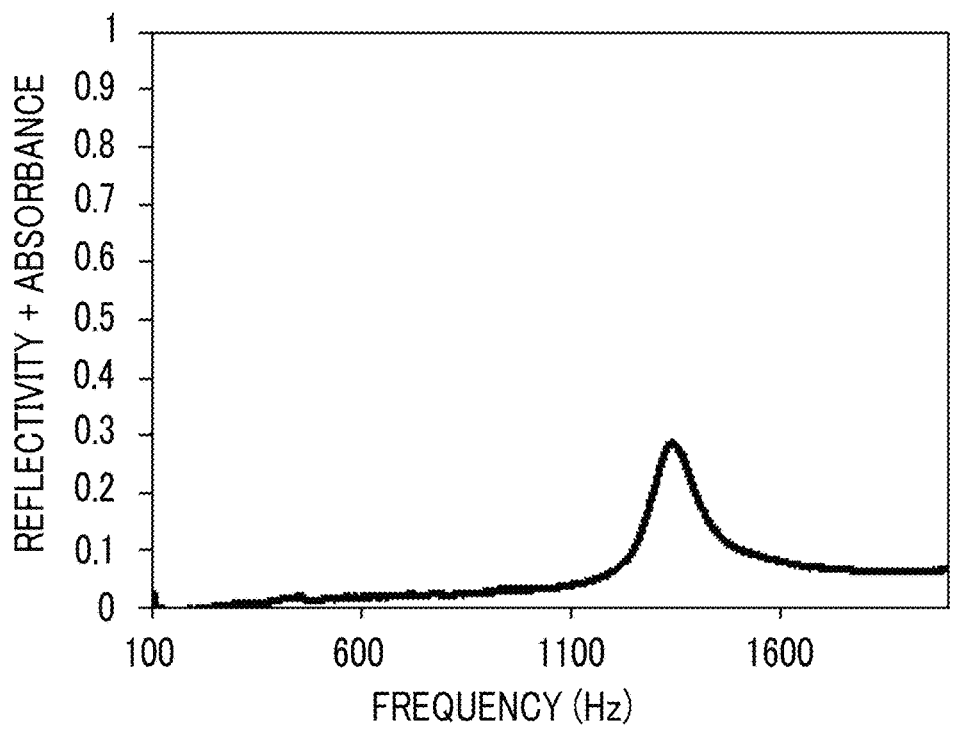
FIG. 33 is a graph showing the measurement result of the acoustic pipe performed on a silencing effect of an air column resonance structure with a sound absorbing body.

FIG. 33 shows the measurement results performed by using the acoustic pipe for the silencing effect under the conditions described above. As can be seen from FIG. 33, at a frequency of 1342 Hz, the reflectivity+absorbance was 28.7%, the half-width was 162 Hz, and the standardized half-width was 0.12.

Further, the air column resonance structure with the sound absorbing body described above was attached to the exhaust side of the propeller guard 56 dedicated to the drone to measure the sound pressure. In this case, the position of the air column resonance structure with the sound absorbing body was a position deviated from the propeller 52 to the exhaust side (lower side) by a distance of 3 cm. The sound pressure was measured by disposing the microphone with the windshield on the exhaust side.

Figure 34:
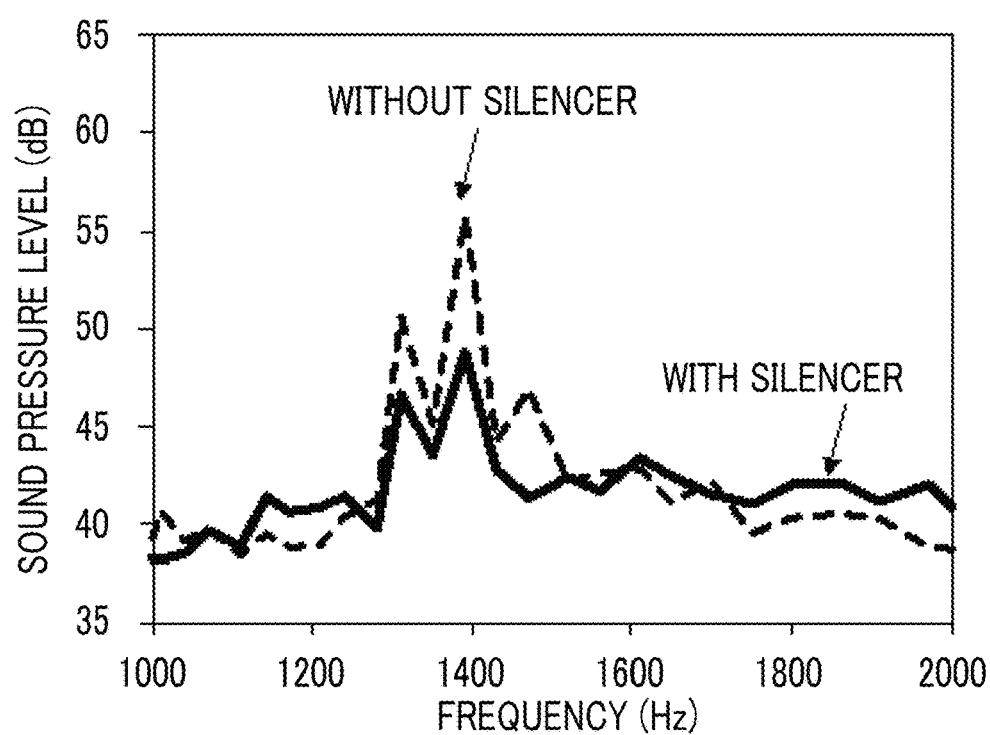
FIG. 34 is a graph showing the measurement result of the sound pressure performed on the air column resonance structure with the sound absorbing body.

FIG. 34 shows the measurement results (solid line graph) in a case in which the air column resonance structure with the sound absorbing body described above was attached and the measurement results (dashed line graph) in a case in which the air column resonance structure with the sound absorbing body described above was not attached. As can be seen from FIG. 34, by attaching the air column resonance structure with the sound absorbing body, it was possible to silence the peak sound on a slightly higher frequency side than 1342 Hz, which was the resonance frequency of the air column resonator 30*b* alone, specifically, 1390 Hz.

From the results described above, the effect of the present invention is clear.

Explanation of References
- 10: blower with silencer
- 12: axial fan
- 14: motor
- 15: through-hole
- 16: casing
- 16*a*: support portion
- 16*b*: outer frame portion
- 16*c*: cover portion
- 16*d*: fixed blade
- 16*e*: hole
- 17: inner space
- 18: rotor blade
- 20: shaft portion
- 22: blade
- 30: silencer
- 30*a*: Helmholtz resonator
- 30*b*: air column resonator
- 30*c*: film type resonator
- 32, 33: case
- 34, 35: opening portion
- 36: inner space
- 37: resonance pipe
- 40: frame
- 42: film
- 44: back space
- 50: moving object with propeller
- 52: propeller
- 54: body
- 56: propeller guard
- 100: measurement box
- 102: base
- PB: probe
- MP1: microphone
- MP2: microphone

What is claimed is:

1. A blower with a silencer, the blower comprising:
   a fan; and
   a silencer that silences a sound generated by the fan,
   wherein the silencer has a resonance characteristic,
   the silencer is disposed at a position connected to a sound field space of the sound generated by the fan, and
   a sum of an absorbance and a reflectivity of the silencer at a resonance frequency measured by using an acoustic pipe is 10% to 43% and a standardized half-width of the silencer is more than 0.05 and 0.25 or less.

2. The blower with a silencer according to claim 1,
   wherein the silencer is connected to an inner space of the fan.

3. The blower with a silencer according to claim 2,
   wherein the silencer has a flow passage communicating with the inner space of the fan.

4. The blower with a silencer according to claim 1,
   wherein the resonance frequency of the silencer measured by using the acoustic pipe deviates from a frequency of a discrete frequency sound caused by the fan by 1% to 10%.

5. The blower with a silencer according to claim 2,
   wherein the resonance frequency of the silencer measured by using the acoustic pipe deviates from a frequency of a discrete frequency sound caused by the fan by 1% to 10%.

6. The blower with a silencer according to claim 3,
   wherein the resonance frequency of the silencer measured by using the acoustic pipe deviates from a frequency of a discrete frequency sound caused by the fan by 1% to 10%.

7. The blower with a silencer according to claim 4,
   wherein the silencer is connected to a position at which a sound pressure of a sound pressure distribution at the frequency of the discrete frequency sound caused by the fan is high, and
   the resonance frequency of the silencer is lower than the frequency of the discrete frequency sound.

8. The blower with a silencer according to claim 4,
   wherein the silencer is connected to a position at which a sound pressure of a sound pressure distribution at the frequency of the discrete frequency sound caused by the fan is low, and
   the resonance frequency of the silencer is higher than the frequency of the discrete frequency sound.

9. The blower with a silencer according to of claim 1,
   wherein the silencer is an air column resonator, and
   a resonance pipe of the air column resonator has a bent structure.

10. The blower with a silencer according to claim 1, wherein the silencer is a combination of a resonator and a porous sound absorbing material.

11. The blower with a silencer according to claim 1, wherein the fan is an axial fan, and the silencer is disposed at a position that does not overlap with a region formed by rotation of a rotor blade as viewed from an axial direction of the axial fan.

12. The blower with a silencer according to claim 1, wherein the fan is an axial fan having a fixed blade, and the silencer is connected to at least one fixed blade opening portion between the fixed blades.

13. The blower with a silencer according to claim 12, wherein the silencer is connected to all the fixed blade opening portions.

14. A moving object with a propeller, the moving object comprising:

the blower with a silencer according to claim 1, wherein the fan of the blower with a silencer is a propeller, and the moving object with a propeller flies by rotation of the propeller.

15. The moving object with a propeller according to claim 14, wherein the silencer of the blower with a silencer is disposed around the propeller to form a propeller guard.

16. The moving object with a propeller according to claim 14, wherein an outer shape of the silencer in a case in which the silencer of the blower with a silencer is viewed from a rotation axis direction of the propeller is a circle or an arc.

17. The moving object with a propeller according to claim 16, wherein the silencer is an air column resonator including a bent resonance pipe, and a part of the resonance pipe is bent in an arc shape in a case in which the silencer is viewed from the rotation axis direction.

* * * * *